United States Patent
Ho

(10) Patent No.: US 8,651,199 B2
(45) Date of Patent: *Feb. 18, 2014

(54) AUTOMATIC TRANSMISSION FOR A POWER TOOL

(75) Inventor: Chi Hong Ho, Kwai Chung (HK)

(73) Assignee: Techtronic Power Tools Technology Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,011

(22) Filed: Apr. 4, 2012

(65) Prior Publication Data

US 2012/0193113 A1 Aug. 2, 2012

Related U.S. Application Data

(63) Continuation of application No. 12/535,801, filed on Aug. 5, 2009, now Pat. No. 8,172,004.

(51) Int. Cl.
*B25B 21/00* (2006.01)

(52) U.S. Cl.
USPC ............... 173/176; 173/178; 173/216

(58) Field of Classification Search
USPC ............ 173/48, 176, 178, 216, 217; 475/153, 475/281, 298
See application file for complete search history.

(56) References Cited

U.S. PATENT DOCUMENTS

| | | | |
|---|---|---|---|
| 3,476,226 A | 11/1969 | Massey | |
| 3,808,904 A | 5/1974 | Gotsch et al. | |
| 5,011,341 A | 4/1991 | DeGroff | |
| 5,019,023 A | 5/1991 | Kurosawa | |
| 5,083,990 A | 1/1992 | Rahm | |
| 5,711,739 A | 1/1998 | Hashimoto et al. | |
| 5,816,121 A * | 10/1998 | Yoshimizu et al. | ............. 81/469 |
| 5,897,454 A | 4/1999 | Cannaliato | |
| 5,954,144 A | 9/1999 | Thames | |
| 5,967,934 A | 10/1999 | Ishida et al. | |
| 6,093,130 A | 7/2000 | Buck et al. | |
| 6,105,450 A | 8/2000 | Sasaki et al. | |
| 6,431,289 B1 | 8/2002 | Potter et al. | |
| 6,502,648 B2 | 1/2003 | Milbourne | |
| 6,676,557 B2 | 1/2004 | Milbourne et al. | |
| 6,805,207 B2 | 10/2004 | Hagan et al. | |
| 6,857,983 B2 | 2/2005 | Milbourne et al. | |
| 6,939,262 B1 | 9/2005 | Yu | |

(Continued)

FOREIGN PATENT DOCUMENTS

| | | |
|---|---|---|
| CN | 2010093036 | 7/2008 |
| JP | 55040254 | 3/1980 |

(Continued)

OTHER PUBLICATIONS

EP10251330 Extended European Search Report dated Oct. 10, 2010, 8 pages.

*Primary Examiner* — Scott A. Smith

(74) *Attorney, Agent, or Firm* — Michael Best & Friedrich LLP

(57) ABSTRACT

A transmission assembly for a power tool includes a first transmission path comprising a high speed transmission path, a second transmission path comprising a low speed transmission path, a controller for one of engaging and disengaging the high speed transmission path, and a clutch for enabling the low speed transmission path to operate at a lower speed than an output of the transmission assembly when the high speed transmission path is engaged.

13 Claims, 32 Drawing Sheets

(56) References Cited

U.S. PATENT DOCUMENTS

| | | |
|---|---|---|
| 6,983,810 B2 | 1/2006 | Hara et al. |
| 6,984,188 B2 | 1/2006 | Potter et al. |
| 7,101,300 B2 | 9/2006 | Milbourne et al. |
| 7,121,361 B2 | 10/2006 | Hara et al. |
| 7,174,973 B1 | 2/2007 | Lysaght |
| 7,220,211 B2 | 5/2007 | Potter et al. |
| 7,223,195 B2 | 5/2007 | Milbourne et al. |
| 7,334,646 B2 | 2/2008 | Hara et al. |
| 7,404,781 B2 | 7/2008 | Milbourne et al. |
| 7,410,441 B2 | 8/2008 | Milbourne et al. |
| 7,452,304 B2 | 11/2008 | Hagan et al. |
| 7,513,845 B2 | 4/2009 | Ho |
| 7,537,064 B2 | 5/2009 | Milbourne et al. |
| 7,717,192 B2 | 5/2010 | Schroeder et al. |
| 7,762,349 B2 | 7/2010 | Trautner et al. |
| 7,854,274 B2 | 12/2010 | Trautner et al. |
| 7,900,715 B2 | 3/2011 | Chen |
| 7,980,324 B2 | 7/2011 | Bixler et al. |
| 8,172,004 B2 * | 5/2012 | Ho ................ 173/176 |
| 8,303,449 B2 * | 11/2012 | Ho et al. ............ 475/153 |
| 2005/0022358 A1 | 2/2005 | Hagan et al. |
| 2005/0028997 A1 | 2/2005 | Hagan et al. |
| 2005/0061524 A1 | 3/2005 | Hagan et al. |
| 2008/0173459 A1 | 7/2008 | Kuroyanagi et al. |
| 2008/0223592 A1 | 9/2008 | Erhardt |
| 2009/0071671 A1 | 3/2009 | Zhong |
| 2009/0071673 A1 | 3/2009 | Zhong et al. |
| 2009/0098971 A1 | 4/2009 | Ho et al. |
| 2009/0173510 A1 | 7/2009 | Milbourne et al. |

FOREIGN PATENT DOCUMENTS

| | | |
|---|---|---|
| JP | 07217709 | 8/1995 |
| JP | 08068461 | 12/1996 |
| JP | 9014433 | 1/1997 |
| WO | WO 9209406 | 6/1992 |
| WO | WO 2008110439 | 9/2008 |

* cited by examiner

AUTOMATIC TRANSMISSION FOR A POWER TOOL

CROSS-REFERENCE TO RELATED APPLICATIONS

This application is a continuation of U.S. patent application Ser. No. 12/535,801 filed on Aug. 5, 2009, now U.S. Pat. No. 8,172,004, the entire content of which is incorporated herein by reference.

FIELD OF THE INVENTION

The present invention relates to power tools, and more particularly to power tool transmissions.

BACKGROUND OF THE INVENTION

Some power tool transmissions are user-configurable to provide different speed outputs. For example, an operator of a multi-speed drilling machine may configure the drilling machine for high speed operation or low speed operation by actuating a mode switch on the drilling machine. However, this requires that the drilling machine be stopped, i.e. the transmission is stopped, in order to actuate the mode switch to effect a change in the speed of operation. It may even require removal of the drilling machine drill bit from the work piece prior to stopping of the drilling machine to effect the change in speed of operation in order to prevent locking or snagging of the drill bit in the work piece.

Other power tools, such as circular saw machines only provide a single speed of operation. The load exerted on the circular saw machine is dependent to some degree on the thickness and type of material being sawed. As such, variability in the speed of operation and thus the torque delivered to the saw blade is desirable. One solution would be to adapt the circular saw machine to have a mode switch of the type often found in drilling machines. However, since such mode switches can only be actuated when the machine is stopped, i.e. the machine's transmission is not operating, this either requires the circular saw machine to be stopped whilst the saw blade is in contact with the work piece or for the work piece to be removed from the circular saw machine. In the first instance, there is a danger when stopping a circular saw machine that is being progressed through a work piece that the saw blade, on stopping in contact with the work piece, will become jammed or snagged in the work piece thereby making restarting the sawing operation difficult. In any event, the lack of continuity in sawing a work piece caused by stopping the saw during its progress through the work piece commonly results in a snitch or discontinuity being created in the saw line through the work piece which is undesirable. In the latter instance, a similar effect can be created when re-introducing a removed work piece to the circular saw machine. In this instance, other problems include realigning the re-introduced work piece in the circular saw machine to continue an interrupted cutting operation.

Furthermore, irrespective of the thickness and type of material being sawed, the load exerted on the circular saw machine is also to some degree dependent on the operator's actions. This is also true of other types of power tools including drilling machines, routers, jig saws, screwdrivers and reciprocating saws. Where an operator of a circular saw machine pushes the saw machine with high force, the loading on the saw machine is greatly increased over that where the operator has a light touch, namely the operator pushes the saw machine forward relatively lightly. This disparity in loading caused by the operator's actions is present even where operators exhibiting the different behaviors mentioned above are sawing identical material of identical thickness.

A further issue affecting the loading exerted on a circular saw machine is disparities in harness of the material being sawed. Again, the same issue affects other types of power tools. In the case of a drilling machine being employed to drill a hole in masonry, for example, the masonry may comprise layers of different hardness material that are encountered in succession. Consequently, even where an operator applies a steady, constant pressure to the drilling machine, the loading on the drill bit and thus on the machine's motor will be dependent to a degree on how hard the layer of material presently being drilled in the masonry is. In the case of a circular saw machine sawing a sheet of soft wood, for example, knots in the wood are relatively harder than the remainder of the wood sheet and result in higher load being exerted on the saw blade and consequently on the motor of the circular saw machine. Whilst a single speed circular saw machine can be successfully used on most occasions to cut through a sheet of wood with knots, there is a tendency for the operator to exert greater force on the saw machine when the saw blade encounters a knot thus greatly increasing the load exerted on the machine's motor through a combination of the two effects of the operator's action in exerting a greater urging force and the change in hardness of the material presently being sawed.

Generally, providing a power tool with a single speed of operation is disadvantageous in that it does not account for disparities in load exerted on the tool's motor through an operator's actions and/or through changes in the characteristics of the work piece being worked, e.g. changes in thickness, nature or type of material being worked. More particularly, providing a power tool with only a low speed, high torque mode of operation will frustrate a user when working with a work piece of a type that could be successfully worked using a high speed, low torque mode of operation. The converse is true when providing a power tool with only a high speed, low torque mode of operation. As already discussed above, one solution is to provide the power tool with more than one speed of operation and a mode selection switch for changing the speed of operation to suit the task in hand. However, operators are apt to always select the highest speed of operation to complete a task as quickly as possible and to persevere with the task in hand at the selected speed of operation even when a mode change would be of benefit. This is because the mode selection switches provided in known power tools require the power tool to be stopped before effecting a change of speed mode and operators are often reluctance to stop and make a speed change. Consequently, even with power tools having a switch mode means for changing the speed of operation, operators are apt to not make use of such switch mode means with the result that it is easy, when operating the power tool at its higher speeds of operation, to overload the tool's motor which can result in burning out of the motor or other damage to the power tool such as damage to a battery of a cordless power tool.

SUMMARY OF THE INVENTION

The present invention provides, in one aspect, a transmission assembly for a power tool. The transmission assembly includes a first transmission path comprising a high speed transmission path, a second transmission path comprising a low speed transmission path, a controller for one of engaging and disengaging the high speed transmission path, and a clutch for enabling the low speed transmission path to operate at a lower speed than an output of the transmission assembly when the high speed transmission path is engaged.

The present invention provides, in another aspect, a method of operating a power tool. The method includes transferring torque from an electric motor through a transmission, detecting an operating current of the motor, comparing the operating current of the motor to a threshold current, and automatically changing a speed of operation of the transmission while the transmission is operating when the operating current equals or exceeds the threshold current.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
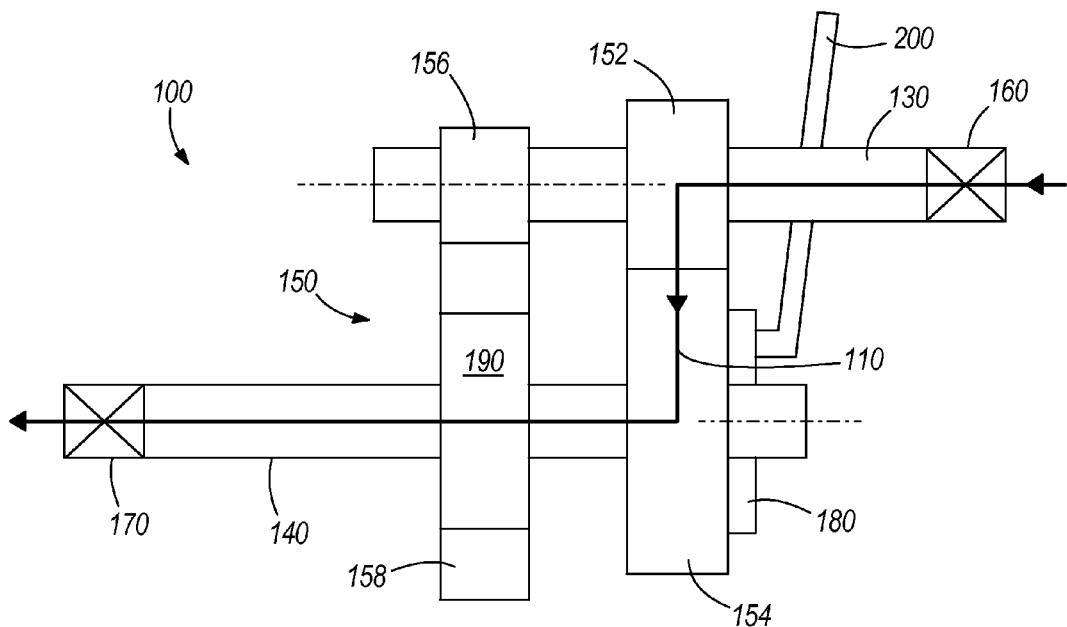
FIG. 1a is a schematic view of a manually operable power tool transmission assembly according to the invention showing a high speed mode of operation.
Figure 1B:
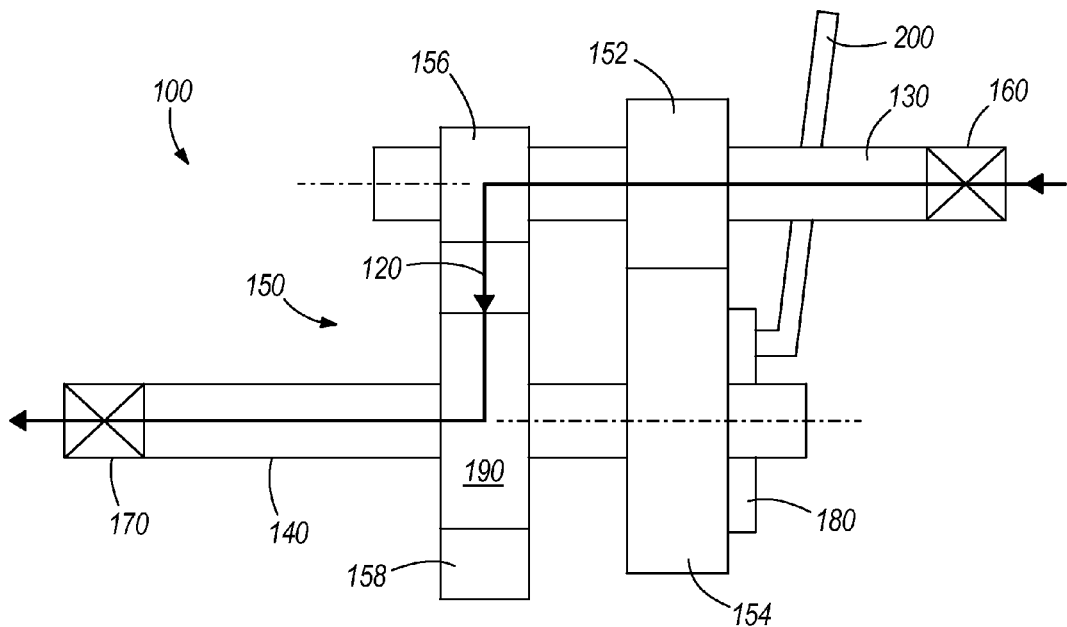
FIG. 1b is a schematic view of the power tool transmission of FIG. 1a showing a low speed mode of operation.

As illustrated by FIGS. 1a and 1b, in a first embodiment, the invention provides a manually operable transmission assembly 100 for a power tool comprising a first transmission path 110 constituting a high speed transmission path (FIG. 1a) and a second transmission path 120 constituting a low speed transmission path (FIG. 1b).

The transmission assembly 100 comprises an input shaft 130 powered by a motor (not shown) and an output shaft 140 powered by the input shaft via a gear train 150. The gear train 150 comprises a first driving gear 152 mounted on the input shaft 130 which meshes with a first driven gear 154 on the output shaft 140. The gear ratio established by the first driving gear 152 and the first driven gear 154 defines a high speed operation of the transmission assembly 100. The gear train 150 also comprises a second driving gear 156 also mounted on the input shaft 130 which meshes with a second driven gear 158 on the output shaft 140. The gear ratio of the second driving gear and the second driven gear define a low speed of operation of the transmission assembly 100.

The high speed of operation of the transmission assembly 100 is illustrated by the arrowed line 110 in FIG. 1*a* comprising drive received at the input shaft 130 from a motor of a power tool, the drive being conveyed via the first driving gear 152 to the first driven gear 154 and conveyed by said first driven gear 154 to said output shaft 140. The output shaft 140 delivers the drive at a high speed, low torque, relatively speaking, to a tool bit (not shown) mechanically coupled to the output shaft 140.

The low speed of operation of the transmission assembly 100 is illustrated by the arrowed line 120 in FIG. 1*b* comprising drive received at the input shaft 140 from a motor of a power tool, the drive being conveyed via the second driving gear 156 to the second driven gear 158 and conveyed by said second driven gear 158 to said output shaft 140. The output shaft 140 delivers the drive at a low speed, high torque, relatively speaking, to a tool bit mechanically coupled to the output shaft 140.

The input shaft 130 may have an input shaft mechanical device 160 or mechanism for coupling said shaft 130 to a shaft of a motor of a power tool to receive input drive torque from said motor. However, the input shaft 130 of the transmission assembly 100 may be integral with the motor shaft and thus comprise an extension of said motor shaft.

The output shaft 140 delivers an output torque of the power tool to a tool bit such as a drill bit, saw blade, screwdriver bit or router bit. The output shaft 140 has an output shaft mechanical device or mechanism 170 for coupling a tool bit to the shaft 140. The nature of the output shaft mechanical device 170 depends on the type of power tool. For example, for a drilling machine, the output shaft mechanical device 170 may comprise a drill chuck for receiving drill bits of various sizes. Rotational motion of the output shaft 140 is delivered through the drill chuck to a drill bit secured in the chuck. In contrast, in the case of a jig saw where, in use, the jig saw blade is moved reciprocally with respect to the jig saw housing, the output shaft mechanical device 170 may includes means for converting the rotational motion of the output shaft to a reciprocating motion to drive a jig saw blade secured in a tool bit holder of the output shaft mechanical device.

The transmission assembly 100 includes a connector 180 operable to perform one of engaging and disengaging the first driven gear 154 from the output shaft 140. The connector 180 may comprise any means suitable for locking or fixing the first driven gear 154 to rotate with the output shaft 140 whereby drive torque received by the first driven gear 154 is transferred to the output shaft 140. The connector 180 may comprise a means for inserting/withdrawing a lock pin or pins between the first driven gear 154 and the output shaft 140 to lock/unlock said first driven gear 154 to said output shaft 140. The connector 180 is operable between two positions. A first position comprises a position at which the connector 180 fixes or locks the first driven gear 154 to the output shaft 140 whereas a second position comprises a position where the connector 180 releases or frees the first driven gear 154 from being locked or fixed to rotate with the output shaft 140. In the second position of the connector 180, the first driven gear 154 is free to rotate independently of the output shaft 140. Consequently, when the first driven gear 154 is disengaged from the output shaft 140, the first driven gear 154 continues to be driven by the first driving gear 152 and therefore continues rotate at the high speed mode of operation, but no longer provides any drive torque to the output shaft 140.

When the first driven gear 154 is disengaged from the output shaft 140, the transmission assembly 100 operates at said low speed of operation. This is because the second driven gear 158 is mounted on the output shaft 140 by an overrunning bearing 190 which defines the low speed operation of the transmission assembly 100. The second driven gear 158 is pressed fitted on the overrunning bearing 190 which is, in turn, preferably press fitted onto the output shaft 140, although any suitable coupling means may be used. A clutch mechanism of the overrunning bearing enables the low speed transmission path 120 to operate at a lower speed than an output of the transmission assembly 100 without applying any drive to the output when the high speed transmission path is engaged and is providing a high speed, low torque drive to the transmission output in a usual or defined direction of operation of the transmission. The clutch mechanism of the overrunning bearing 190 allows the second driven gear 158 to rotate at a slower speed than the output shaft 140 in a defined direction, this being the defined direction of drive for the transmission assembly. Thus, when the transmission assembly 100 is operating in its high speed mode of operation with the first driven gear 154 fixed for rotation with the output shaft 140, the overrunning bearing 190 enables the second driven gear 158 to still be driven by the second driving gear 156 but not deliver any drive torque to the output shaft 140 because the output shaft 140 is being driven at a higher speed of rotation than that of the second driven gear 158.

It can be seen therefore that the first and second driven gears 154, 158 of the two transmission paths 110, 120 are permanently driven during operation of the transmission. When the first driven gear 154 is disengaged, i.e. unlocked, from rotating with the output shaft and thus no longer delivers drive to the output shaft, the transmission assembly 100 slows from its high speed, low torque mode of operation. Once the speed of operation reduces sufficiently, the clutch of the overrunning bearing 190 enables drive to be delivered from the second driven gear 158 to the output shaft 140 to seamlessly establish the low speed, high torque mode of operation of the transmission assembly 100. This is advantageous in that the second driven gear 158 can be constantly driven even when the transmission assembly 100 is operating at its high speed of operation. Furthermore, by unlocking the first driven gear 154 from rotating with the output shaft 140 when changing to the low speed of operation enables the first driven gear 154 to be constantly driven because the first driven gear 154 can continue to rotate at said high speed, but is no longer delivering any drive to the output shaft 140. Consequently, the transmission assembly 100 does not require the axial or other movement of meshing gears relative to one another to effect a change in speed of operation as is often required in conventional transmissions. Furthermore, the change in speed of operation of the transmission assembly 100 of the invention can be effected whilst the transmission assembly 100 is operating and can be effected in either direction, namely changed from high speed to low speed of operation or changed from low speed to high speed of operation whilst the transmission assembly is operating. There is no requirement to stop the transmission of the power tool when effecting a change in the speed of operation in either direction, i.e. when stepping down the speed of operation or when stepping up the speed of operation.

In this embodiment, the connector 180 is manually operable to perform one of engaging and disengaging the first driven gear 154 from the output shaft 140. The connector 180 has a lever or mode switch 200 associated therewith which is accessible externally of a housing (not shown) of the power tool. The lever or mode switch 200 may be manually manipulatable to cause the connector 180 to move to lock or unlock the first driven gear 154 from the output shaft 140 thereby effecting a change in the speed of operation of the power tool transmission. The lever or mode switch 200 may be ergonomically located externally of the power tool such that an operator of the power tool can manually operate said lever or mode switch 200 whilst continuously operating the power tool to work on a work piece. In other words, the operator is not required to stop using the power tool to effect a change of speed of operation using the lever or mode switch 200. This offers distinct advantages over known power tools having mode selection switches to change a speed of operation where the power tool must be stopped to actuate the mode switch.

Figure 2A:
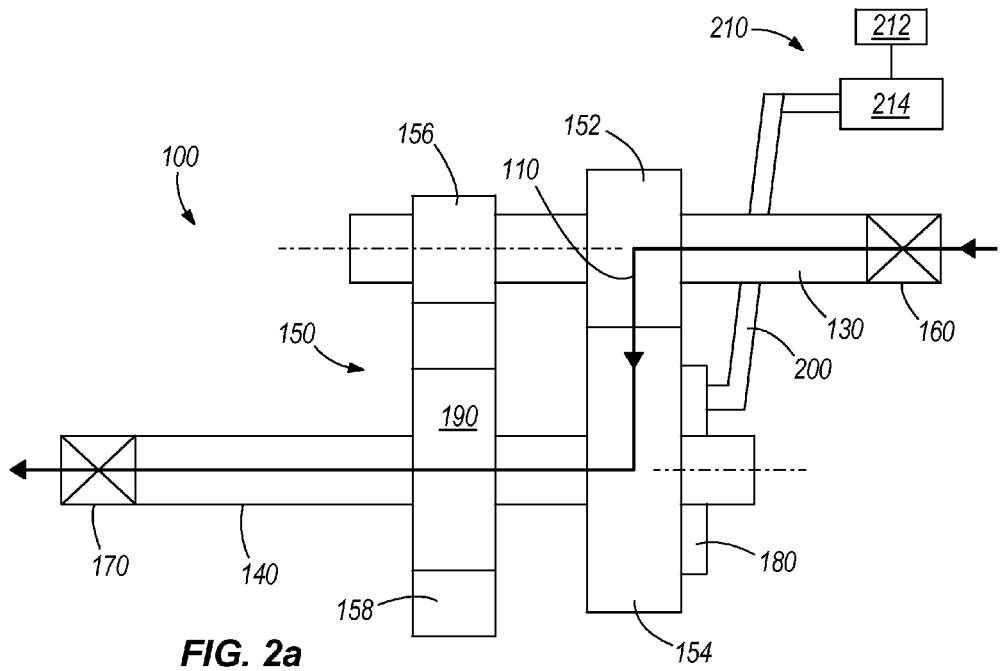
FIG. 2a is a schematic view of an automatically operable power tool transmission assembly according to the invention showing a high speed mode of operation.
Figure 2B:
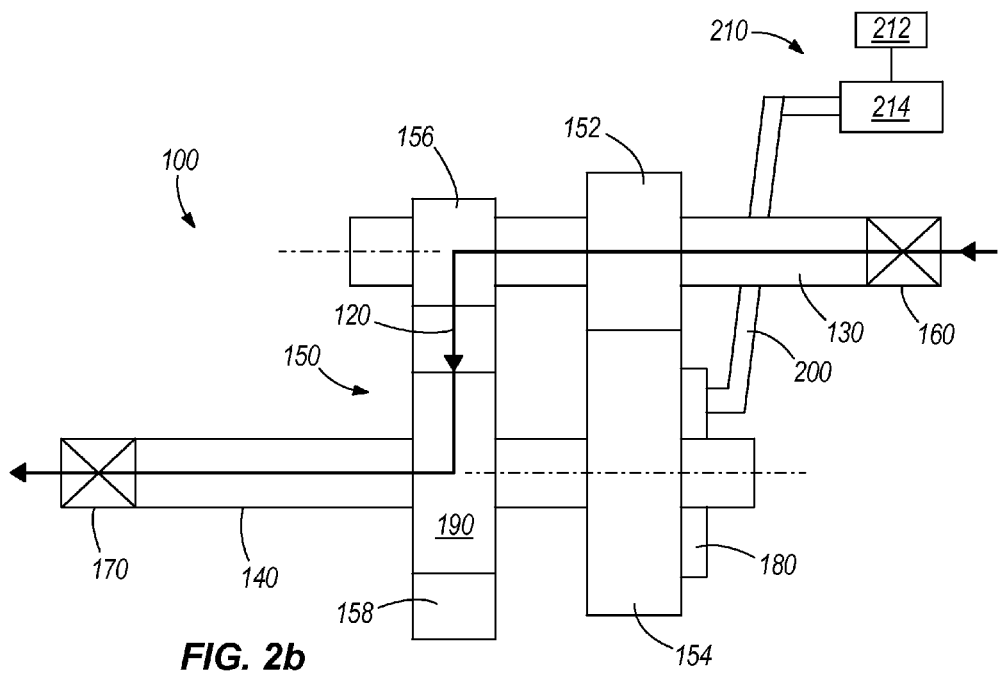
FIG. 2b is a schematic view of the power tool transmission of FIG. 2a showing a low speed mode of operation.

As illustrated by FIGS. 2a and 2b, in a second embodiment, the invention provides an automatically operable transmission assembly 100 for a power tool comprising a first transmission path 110 constituting a high speed transmission path (FIG. 2a) and a second transmission path 120 constituting a low speed transmission path (FIG. 2b).

The transmission assembly 100 of this embodiment is generally the same as that for the embodiment of FIGS. 1a and 1b and thus like numerals will be used to denote like parts. This embodiment differs, however, in that it automatically changes the speed of operation of the transmission assembly 100 in response to an amount of load exerted on the power tool motor.

A control mechanism 210 is provided for causing the connector 180 to disengage the high speed transmission path 110 in response to monitored operating current of an electric motor providing a driving torque to an input of the transmission. When disengaged, a driven gear 154 of the high speed transmission path 110 continues to be driven, but the driven gear 154 is disengaged from an output of the transmission. Consequently, under these circumstances, the low speed transmission path 120 is the 'active' transmission path providing a low speed, high torque drive to the transmission output.

The connector 180 is automatically operable to perform one of engaging and disengaging the first driven gear 154 from the output shaft 140 in response to a load exerted on the output shaft 140. The transmission assembly 100 includes the control mechanism 210 which is arranged to monitor the load exerted on the output shaft 140 by monitoring a current drawn by an electric motor driving the input shaft 130 of the transmission assembly 100. The control mechanism 210 comprises a controller 212 operable to detect an operating current of the electric motor and to compare the operating current to at least one threshold current. A solenoid 214, electrically connected to the controller 212; is provided to act on the lever or mode switch 200 to move the connector 180 from its first position to its second position in response to one of energizing or de-energizing the solenoid 214. The controller 212 may comprise a processor and a memory storing program instructions executable by the processor for implementing the steps of comparing the operating current of the motor to one or more threshold currents and to conveying control signals to the solenoid and/or associated power supply switching means for energizing/de-energizing the solenoid.

This arrangement is advantageous in that changes of speed of operation of the power tool occur automatically in response to monitored load on the power tool motor. Consequently, an operator of the power tool is not required to manually effect a change in speed of operation. Instead, the power tool's speed of operation is changed as required to account for, for example, the manner by which the operator is operating the power tool or the thickness and/or nature of the material being worked. Furthermore, the speed of operation is changed automatically whilst the transmission is operating and thus there is no requirement for an operator of the power tool to stop the power tool to facilitate a speed change.

The controller 212 is preferably operable to compare the operating current of the electric motor to first and second threshold currents, wherein the first threshold current is higher than the second threshold current, and wherein, when the operating current equals or exceeds the first threshold current, the connector 180 is operated to disengage the first driven gear 154 from the output shaft 140. When the operating current is equal to or below the second threshold current, the connector 180 is operated to engage the first driven gear 154 to the output shaft 140. A difference between the first and second threshold currents is selected as being of sufficient magnitude to prevent the connector 180 being operated to successively disengage and engage the first driven gear 154 to the output shaft 140 within a short period of time.

The advantage of having a first, higher threshold to trigger a switch from the high speed of operation to the lower speed of operation than a second, lower threshold for triggering a change in the reverse direction, is to create a buffer zone between the thresholds that prevents' chatter, namely the successive switching between modes of operation during a short period of time that can occur where only a single threshold is used and the power tool load is hovering around the single threshold.

The initial state of operation of the power tool assembly is the high speed of operation, although it will be understood that this is not an essential feature of the transmission. The initial state could be arranged to be the low speed of operation. In any event, the power tool transmission is automatically operated at the speed of operation that is best suited to the prevailing needs of the task at hand and thus reduces user frustration and reduces the possibility of a user overloading the power tool motor and damaging it or the tool bit or overloading or damaging the battery of a cordless power tool, for example.

The power tool having a transmission assembly according to the first and second embodiments may comprise one of: a drill; a jig saw; a circular saw machine; a router; a screwdriver; and a reciprocating saw, although the transmission assembly is applicable to any suitable power tool configuration.

A method of operating a power tool having a transmission according to the second embodiment comprises transferring torque from an electric motor through the transmission assembly; detecting an operating current of the power tool motor, comparing the operating current of the motor to a threshold current, and automatically changing a speed of operation of the transmission assembly whilst the transmission assembly is operating when the operating current equals or exceeds the threshold current.

Figure 3:
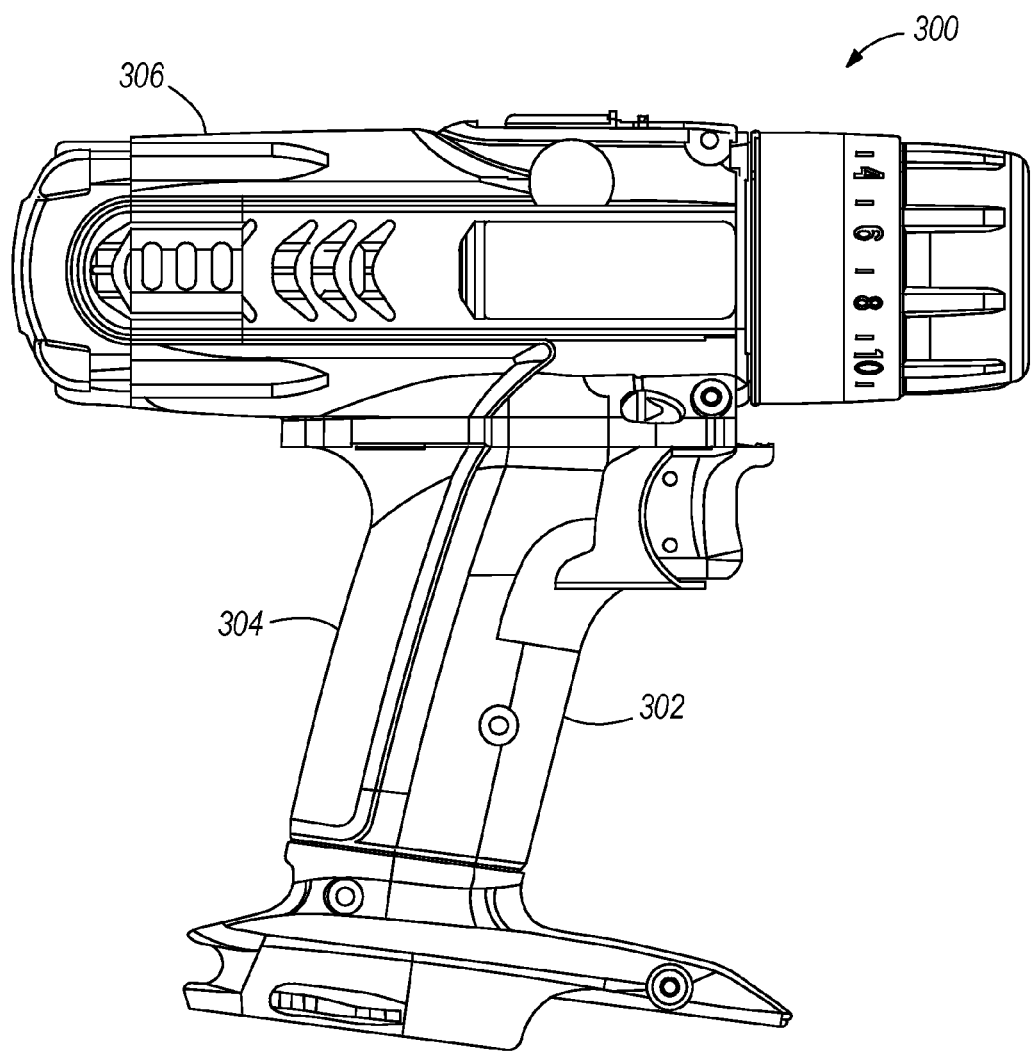
FIG. 3 is an illustration of an exemplary power tool containing a variable speed transmission.
Figure 4:
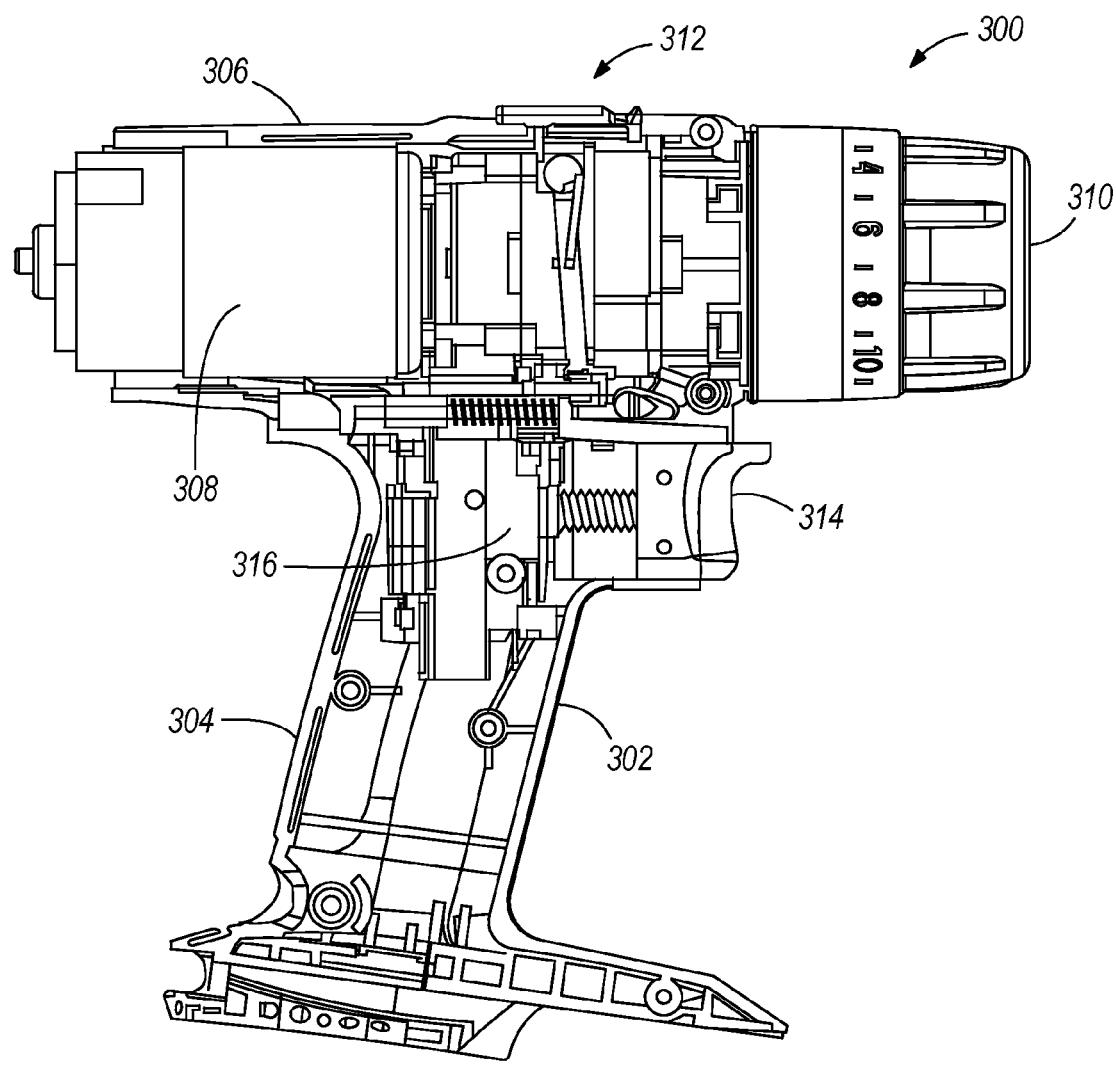
FIG. 4 is an illustration of the power tool of FIG. 3 with portions removed to better illustrate features of the invention.

An example of a power tool that may incorporate a variable speed transmission according to the first or second embodiments is as shown in FIGS. 3 and 4. The power tool 300 may be powered from an external power source via a power cord or may be battery powered. The power tool may include a power tool housing 302 that may receive the power cord or the battery pack. The power tool housing 302 may have a handle portion 304 and a drive portion 306. As shown in FIGS. 3 and 4, the drive portion 306 may include a motor 308, an output 310 and a drive train 312 located intermediate the motor 308 and the output 310. The drive train 312 may include a variable speed transmission to mechanically change the speed of the output. The power tool 300 may also include a trigger switch 314 and a motor switch 316 for selectively activating the motor to supply power to the drive train. The power tool may comprise a drilling machine or may comprise a jig saw, a router, a screwdriver or a reciprocating saw.

Figure 5:
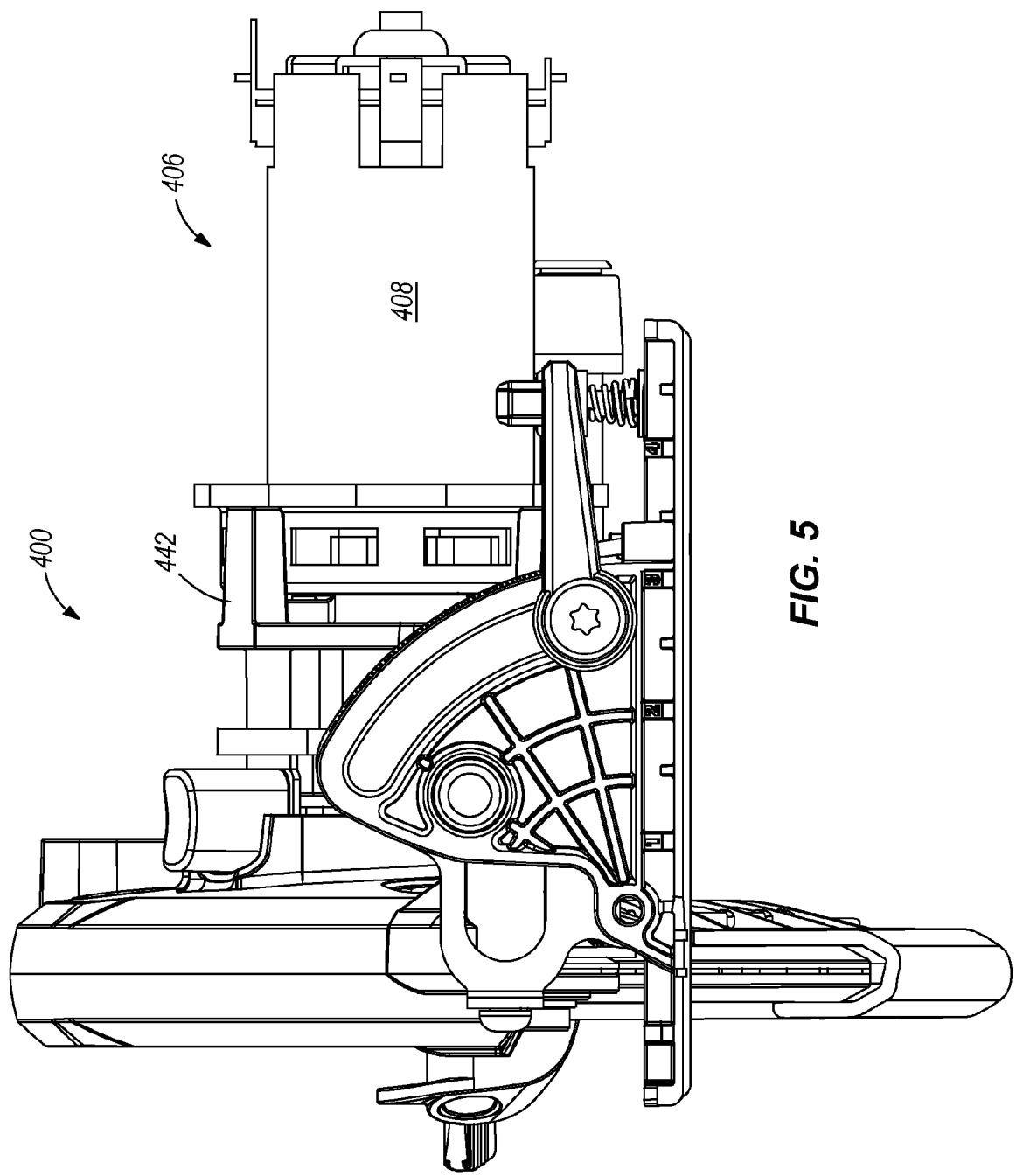
FIG. 5 is an illustration of another exemplary power tool containing a variable speed transmission.
Figure 6:
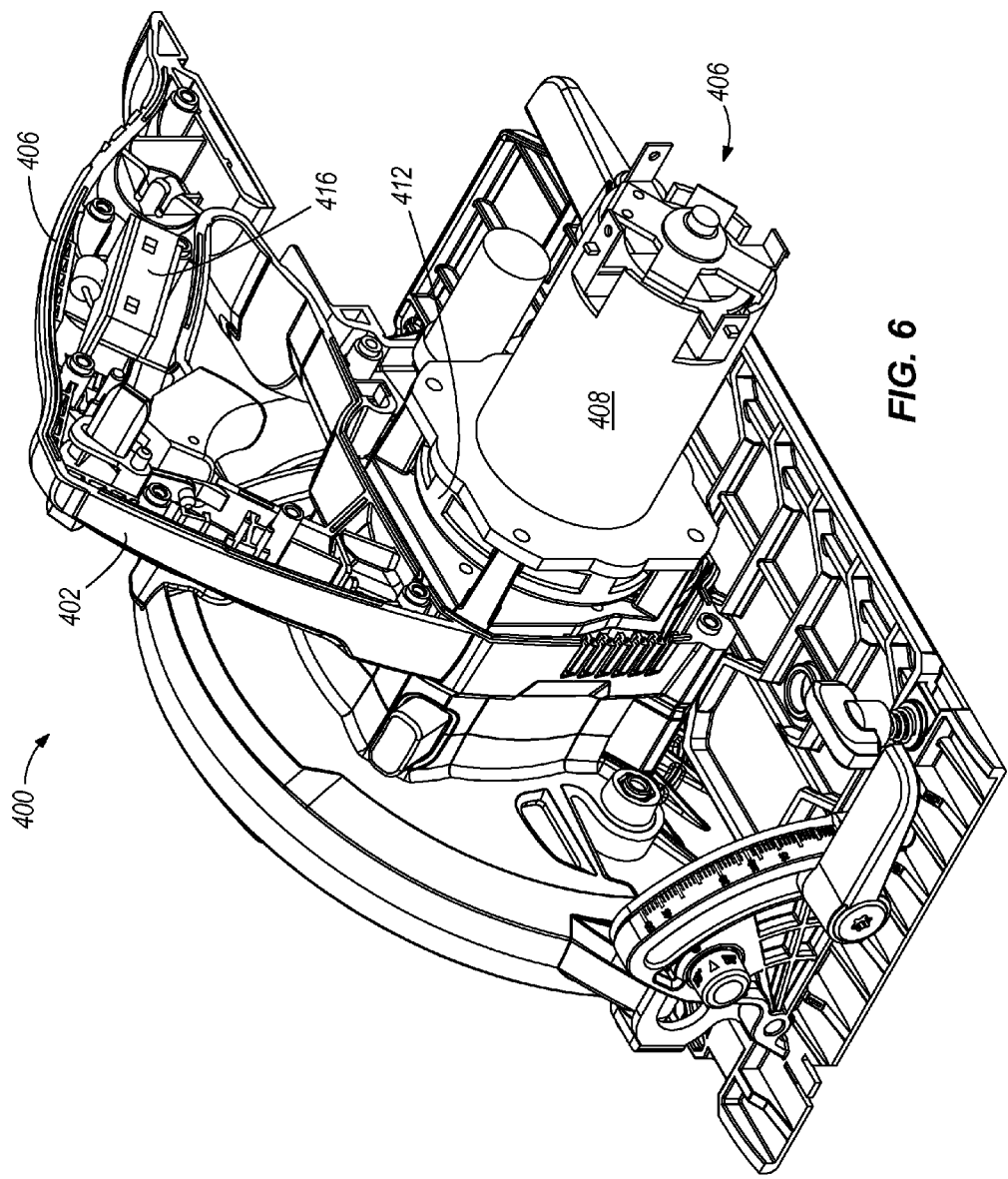
FIG. 6 is an illustration of the power tool of FIG. 4 with portions removed to better illustrate features of the invention.
Figure 7:
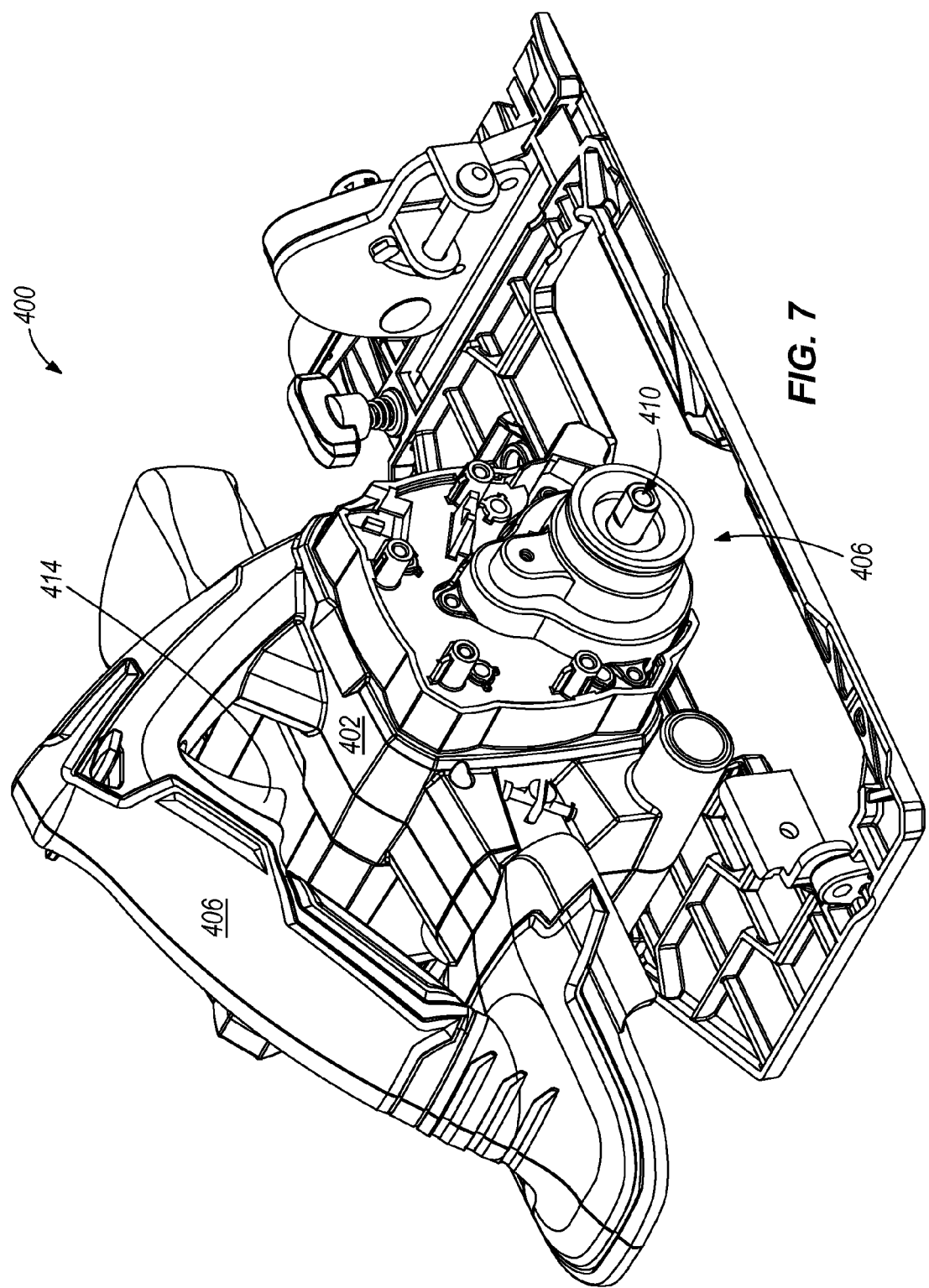
FIG. 7 is an illustration of the power tool of FIG. 4 with portions removed to better illustrate features of the invention.

An example of another power tool that may incorporate a variable speed transmission according to the first or second embodiments is as shown in is shown in FIGS. 5 to 7. The power tool 400 may be powered from an external power source via a power cord or may be battery powered. The power tool may include a power tool housing 402 that may receive the power cord or the battery pack. The power tool housing 402 may have a handle portion and a drive portion 406. As shown in FIGS. 5 to 7, the drive portion 406 may include a motor 408, an output 410 and a drive train 412 located intermediate the motor and the output. The drive train may include a variable speed transmission to mechanically change the speed of the output. The power tool may also include a trigger switch 414 and a motor switch 416 for selectively activating the motor to supply power to the drive train. The power tool may comprise a circular saw.

Figure 8:
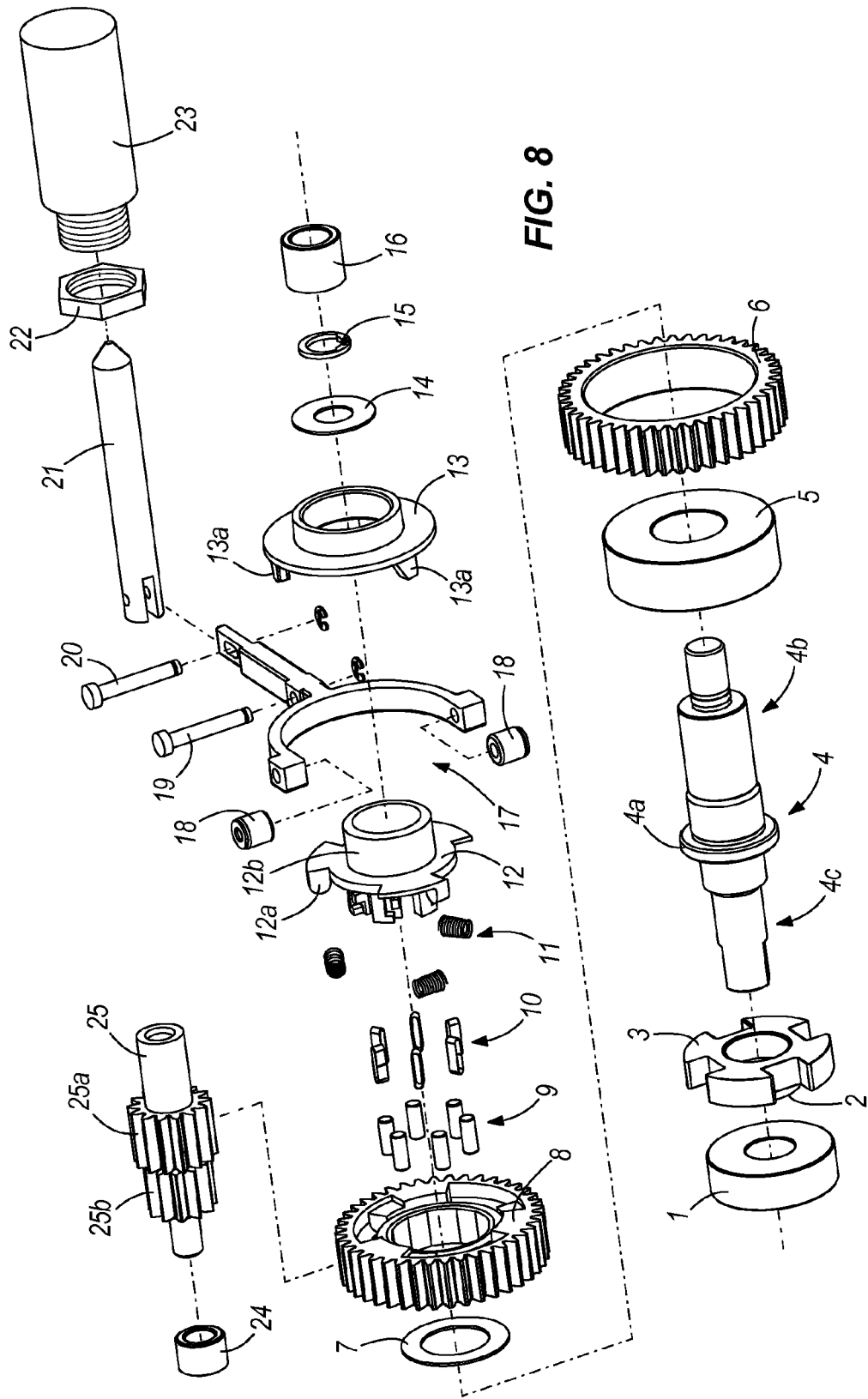
FIG. 8 is an exploded view of components comprising a power tool transmission assembly according to the invention.

FIG. 8 illustrates in an exploded view the components comprising the transmission assembly 100 according to the invention.

The transmission assembly 100 comprises a bearing 1 which mounts one end of the output shaft, i.e. spindle, 4 within the housing (not shown) of a power tool. The bearing 1 is preferably a roller bearing, although any suitable bearing or bushing may be utilized. An optional spacer 2 may be provided which sits on the spindle 4 between the bearing 1 and a manual spindle lock plate 3, although the spacer 2 and the manual spindle lock plate are not essential components of the transmission assembly. The manual spindle lock plate 3 enables an operator of the power tool to lock the spindle 4 to prevent rotation, but the spindle lock plate 3 is otherwise immaterial to the claimed invention.

The spindle 4 comprises the transmission assembly output shaft. The spindle 4 may have a central collar 4a dividing the spindle into first and second end portions 4b, 4c. The bearing 1 supports a second end portion 4c of the spindle 4. Also mounted on this end portion 4c of the spindle 4 is the second driven gear 6 of the low speed, high torque transmission path of the transmission assembly. The second driven gear 6 is not directly mounted to the spindle 4 but is mounted thereon via an overrunning bearing or clutch 5. The overrunning bearing 5 is preferably press fitted on to the spindle 4 with the second driven gear 6 being preferably press fitted onto the overrunning bearing 5, although any suitable means of mounting the second driven gear 6 to the overrunning bearing 5 and the over running bearing 5 to the spindle 4 may be used. In operation, the overrunning bearing enables the second driven gear 6 to rotate more slowly than the spindle 4 in a defined direction.

The over running bearing 5 comprises outer and inner ring members coupled via a clutch mechanism (not shown). When the outer ring rotates more slowly than the inner ring in a defined direction, there is no engagement via the clutch mechanism between the outer and inner rings, i.e. the outer ring is free to rotate at a slower speed than the inner ring in said defined direction. However, when the inner ring slows to a speed tending to be less than that of the outer ring in the defined direction then the clutch mechanism engages the outer ring to the inner ring to convey any driving force applied to the outer ring through to the inner ring. When the outer ring rotates more quickly than the inner ring in a direction opposite to the defined direction then again there is no engagement between the inner and outer rings through the clutch mechanism and the outer ring is free to rotate at said faster speed than the inner ring in said opposite direction. The transmission assembly is arranged such that the normal drive direction for the second driven gear coincides with the defined direction where the outer ring provides drive to the inner ring via the clutch mechanism when the outer ring is tending to go more quickly than the inner ring. In this connection, a skilled artisan will be familiar with the operating principle of an overrunning bearing/clutch.

A washer 7 may be proved which is located adjacent the collar 4a on the first end portion 4b of the spindle 4 and which acts to limit axial movement of the first driven gear 8 and lock pins 9. The first driven gear 8 is mounted on said first end portion 4b of the spindle 4.

The connector of the transmission assembly comprises a cam plate 13 and a carrier 12. The carrier 12 is mounted on the spindle 4 so as to engage the first driven gear 8 and the cam plate 13 is mounted on the carrier 12 so as to engage the carrier 12. The cam plate 13 is movable axially along the spindle 4 with respect to the carrier 12. A plurality of lock pins 9 are provided on the carrier 12 which, when the cam plate is in a first position, lock or fix the first driven gear 8 for rotation with the spindle 4 and, when the cam plate 12 is in a second position, release or free the first driven gear 8 from the spindle 4 such that the first driven gear 8 can rotate independently of the spindle 4. The lock pins 9 are arranged to engage an inner surface of the first driven gear 8 when the carrier is in its first position in order to wedgedly fix its position with respect to the spindle 4 such that the first driven gear 8 rotates with the spindle 4, i.e. the first driven gear 8 conveys any driving force it receives to the spindle 4. The carrier 12 therefore functions to control the position of the lock pins 9. The carrier 12 is provided with a number of spring plates 10 which urge the lock pins into contact between the inner surface of the first driven gear 8 and the spindle 4 when the carrier 12 is in its first position. Whilst a plurality of lock pins 9 is provided for fixing the position of the first driven gear 8 relative to the spindle 4, it will be understood that only one lock pin 9 may be required or some other suitable means could be employed for successively locking and releasing the first driven gear 8 from being fixed for rotation with the spindle 4.

A set of three springs 11 is provided for urging the carrier 12 to rotate about the spindle 4 a short distance from its second position to its first position where the lock pins 9 are wedgedly fixing the position of the first driven gear 8 with respect to the spindle 4. The springs 11 are located in respective recesses in the body of the first driven gear and act on respective front abutment surfaces of axially extending abutment members 12a of the carrier 12 which extend into said recesses to urge said carrier 12 towards its first position. The carrier 12 comprises a plastics material extruded member and the abutment members 12a are provided by integrally, extruded portions of the carrier 12, although the carrier may be formed from any other suitable material and need not comprise an integrally formed component.

The cam plate 13 is arranged to move axially along a collar 12b of the carrier 12 such that respective wedge shaped cam members 13a of the cam plate 13 engage respective back abutment surfaces of the abutment members 12a of the carrier 12 and urge it towards its second position in opposition to the springs 11. The back abutment surfaces of the abutment members 12a are formed on opposite sides of said abutment members 12a to those comprising the front abutment surfaces. It is necessary to apply an axial urging force to the cam plate 13 that is greater than the rotational force exerted by the springs 11 on the abutment members 12a of the carrier 12 to cause said carrier 12 to rotate from its initial first position to its second position where the lock pins 9 are released or freed from contact with the first driven gear 8 and thus release the first driven gear from its fixed position for rotation with the spindle 4.

A rear washer 14 may be provided which limits axial movement of the cam plate 13 and carrier 12 on the first end portion 4b of the spindle 4. A retaining ring 15 may be provided to retain the washer 14. A bushing 16 is provided for supporting another end of the spindle 4 in the power tool housing.

In order to effect axial movement of the cam plate 13 to cause rotation of the carrier 12 from its first to second positions, a speed change lever member 17 is provided. The speed change lever 17 has at one end a "C" shaped portion comprising first and second arms which each carry a respective bearing 18. The bearings 18 contact, in use, a rear surface of the cam plate 13 and act to guide the cam plate 13 between first and second axial positions on the spindle 4, said first axial position corresponding to the first position of the carrier 12 and said second axial position corresponding to the second position of the carrier 12. When the speed change lever 17 is in its first position, the cam plate 13 carried on the collar 12b of the carrier 12 is spaced from a rear flange of the carrier from which the abutment members 12a project by a small axial distance along the spindle 4 such that the carrier 12 is maintained in its first rotated position under the biasing action of the springs 11. However, when the speed change lever 17 is used to urge the cam plate 13 axially along the collar 12b towards the carrier flange, the cam members 13a of the cam plate 13 engage the back abutment surfaces of the abutment members 12a of the carrier 12 to cause the carrier 12 to rotate against the biasing action of the springs 11 to its second position where the first driven gear 8 is released from being fixed to rotate with the spindle 4.

In a manually operable embodiment of the transmission assembly of the invention, another end of the speed change lever 17 is arranged to extend externally of a housing of the power tool to be accessible for manual operation. An operator could therefore change the speed of operation by simple manipulation of the lever 17, namely by moving it to effect axial movement of the cam plate 12 on the collar 12b of the carrier 12. Preferably, the end of lever 17 would be positioned externally of the power tool housing at a position that is ergonomically suitable for easy access to an operator operating the power tool on a work piece or the like.

More preferably, the other end of the lever 17 is linked to a plunger 21 of a solenoid 23 via pin members 19, 20 which enable the lever 17 to pivot about pin member 19 whereby movement of the solenoid plunger 21 is transferred by the lever 17 to the cam plate 13 to causes axial movement of the cam plate 13 to engage the carrier 12 in the manner aforedescribed. A nut 22 or any other suitable means may be provided for mounting the solenoid to a gear transmission housing or other suitable housing part of the power tool. The solenoid 23 may be a pull type solenoid although any suitable solenoid may be employed.

A pinion 25 comprises the input shaft of transmission assembly. The pinion 25 carries the first and second driving gears 25a, 25b of the power tool transmission. The first driving gear 25a permanently meshes with the first driven gear 8 whereas the second driving gear 25b permanently or constantly meshes with the second driven gear 6. A bushing 24 is provided for supporting one end of the pinion 25 in the power tool housing.

In the transmission assembly of FIG. 8, the connector is operated to engage a driven gear of a transmission path with the spindle 4 to fix it for rotation in a defined direction through the wedging action of the lock pins 9 between an inner surface of the driven gear and an outer surface of the spindle 4. In other words, when the driven gear of the transmission path is being driven at a speed that is tending to exceed that of the spindle 4 (although it cannot actually exceed said speed), the driven gear urges the lock pins of the carrier 12 to further wedgedly engage the driven gear to the spindle 4 and thus drive provided to the driven gear is conveyed to the spindle 4 and the spindle 4 is driven at the operating speed of said transmission path. However, in the event that the spindle 4 is somehow driven at a speed of rotation faster than the speed of rotation of the driven gear of said transmission path, the faster speed of the spindle 4 relative to the driven gear releases to a sufficient degree the wedged engagement of the lock pins 9 between the driven gear and the spindle 4 such that the driven gear can 'slide' relative to the spindle 4, i.e. rotate at a slower speed than the spindle 4. Thus, even though the cam plate 13, carrier 12 and lock pins 9 of said transmission path are in their engaged positions, they act in the manner of an overrunning bearing to allow the driven gear of said transmission path to rotate more slowly than the spindle 4. This feature of the connector arrangement of the transmission and its advantages will become more apparent in the following description of embodiments of the transmission having more than two speeds of operation. Consequently, the connector arrangement as described with respect to FIG. 8 operates as and thus comprises an overrunning bearing or clutch. It will therefore be appreciated that the driven gear of the low speed transmission path could be mounted to the output shaft by a connector generally as described above, but where it is maintained or established in an always operative position, i.e. the locks pins are urged to their wedgedly engaged position. There would also be no requirement to include a lever or mode switch as part of such a connector for the low speed transmission path as there would be no requirement to operate said connector to disengage the driven gear of the low speed transmission path from the spindle.

The operation and other features of the transmission assembly and a power tool having such a transmission assembly are illustrated by FIGS. 1 to 6 in concert with FIGS. 9 to 30 of the drawings.

Figure 21:
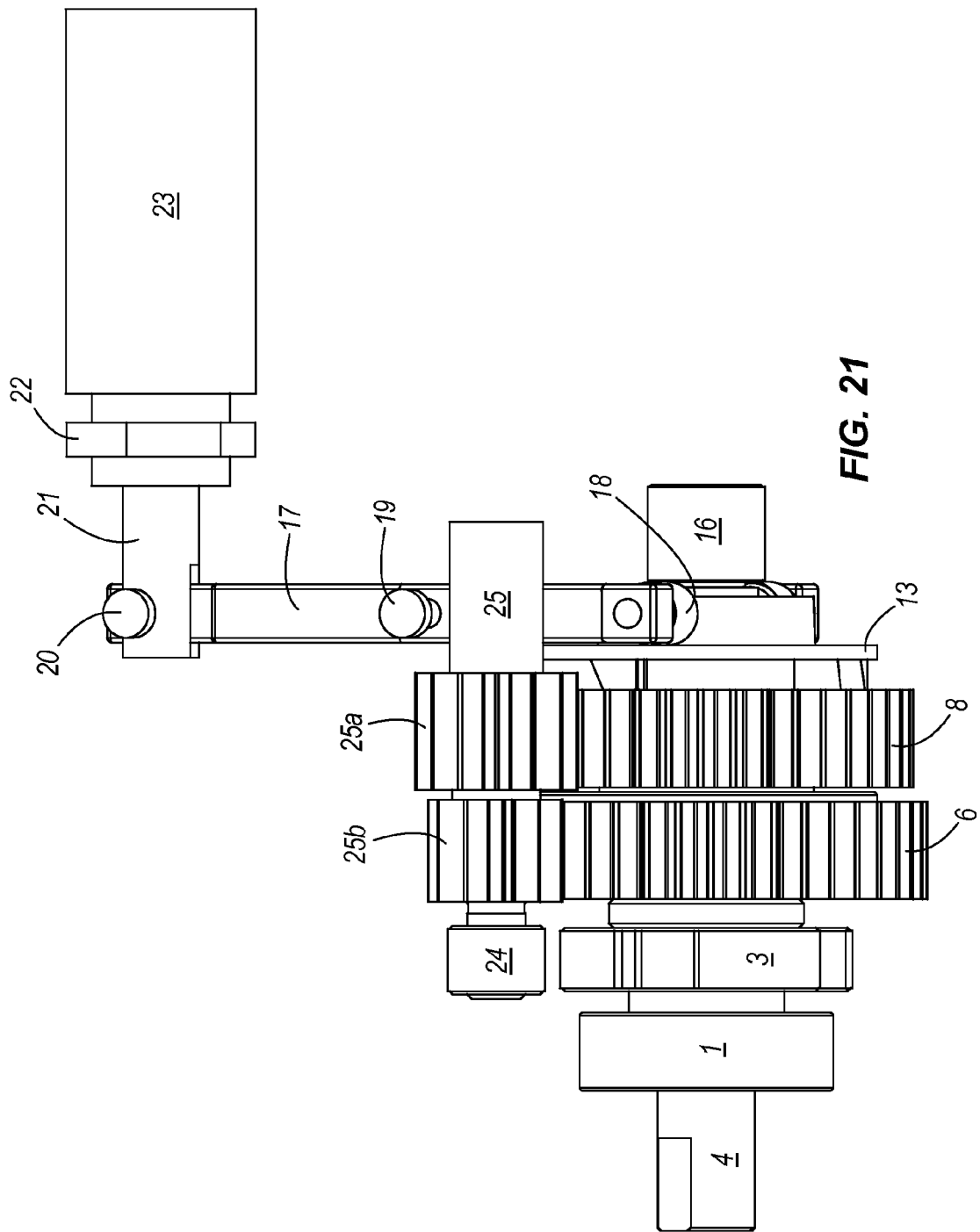
FIG. 21 is a side view of the transmission assembly of FIG. 18 with the connector in its first position.

In use, the solenoid 23 is de-energized with the plunger 21 being in an extended position with respect to the solenoid housing (FIG. 21). When energized, the solenoid 23 pulls the plunger 21 to a non-extended position as can be best seen in FIG. 27. As such, the solenoid acts in a pull configuration. However, it will be understood that a push configuration solenoid could equally well be employed for effecting appropriate movement of the plunger.

Furthermore, whilst the solenoid 23 is arranged to be de-energized when the plunger 21 is in its first, extended position with respect to the solenoid housing which corresponds to the first position of the carrier 12 effecting high speed operation of the transmission assembly, it will be understood that these are merely preferred arrangements and that alternative configurations apply.

FIGS. 9 to 17 illustrate the transmission assembly 100 of the invention assembled with a power tool motor 30. Like numerals to those used to denote the components of the transmission assembly with respect to FIG. 8 will be employed in FIGS. 9 to 17.

Figure 9:
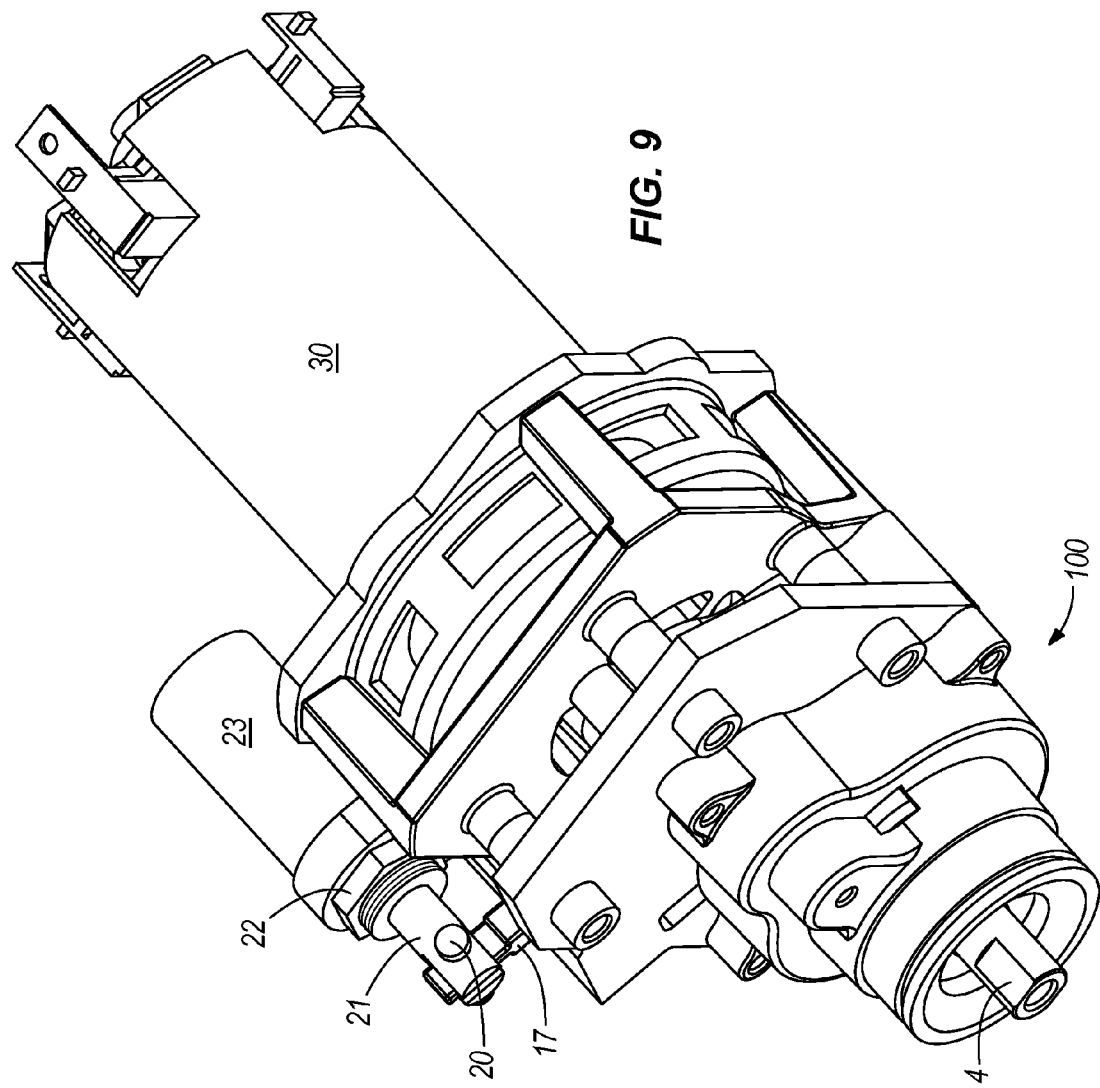
FIG. 9 is a perspective view of a power tool motor and transmission assembly according to the invention.
Figure 10:
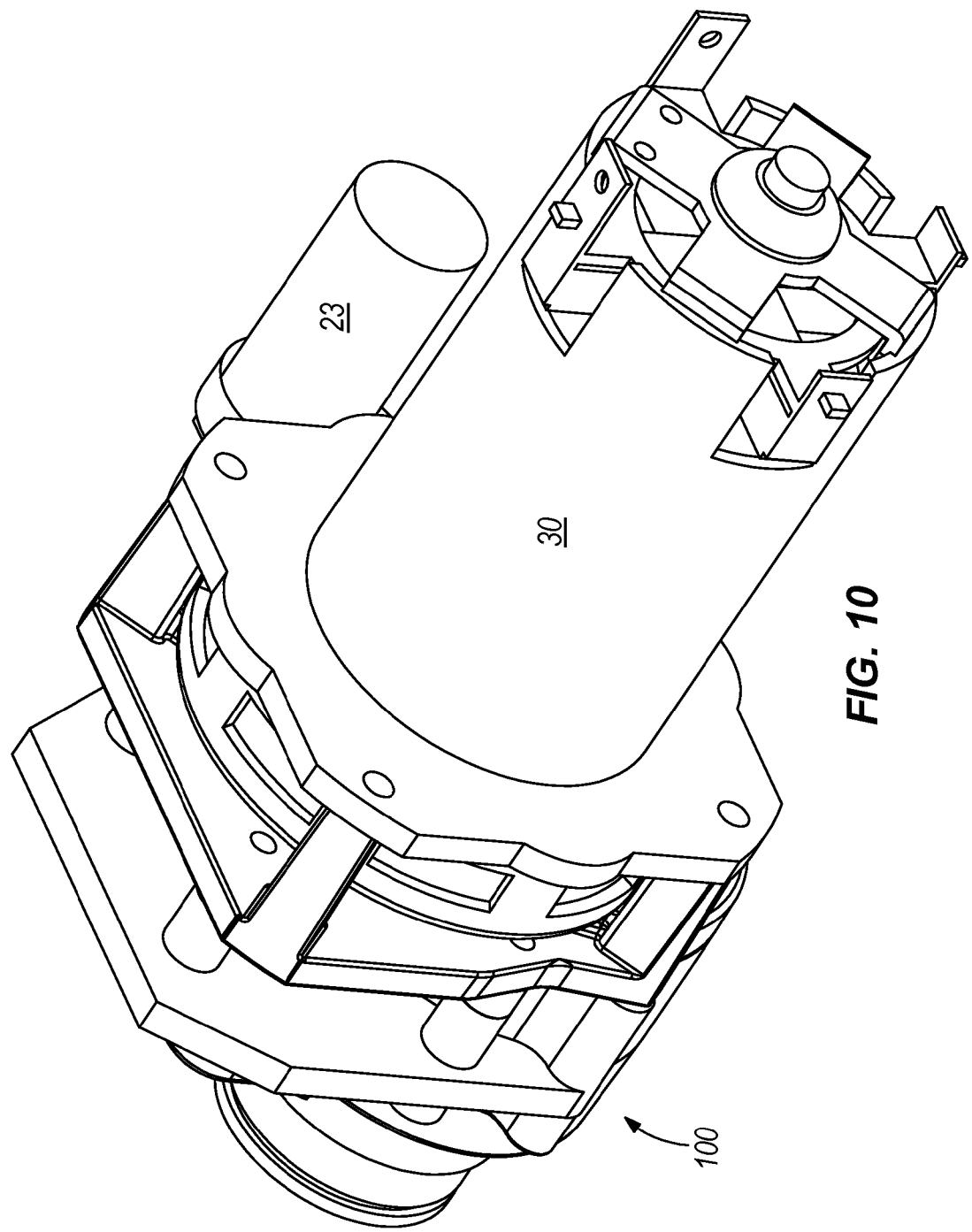
FIG. 10 is a further view of the power tool and transmission assembly of FIG. 9.
Figure 11:
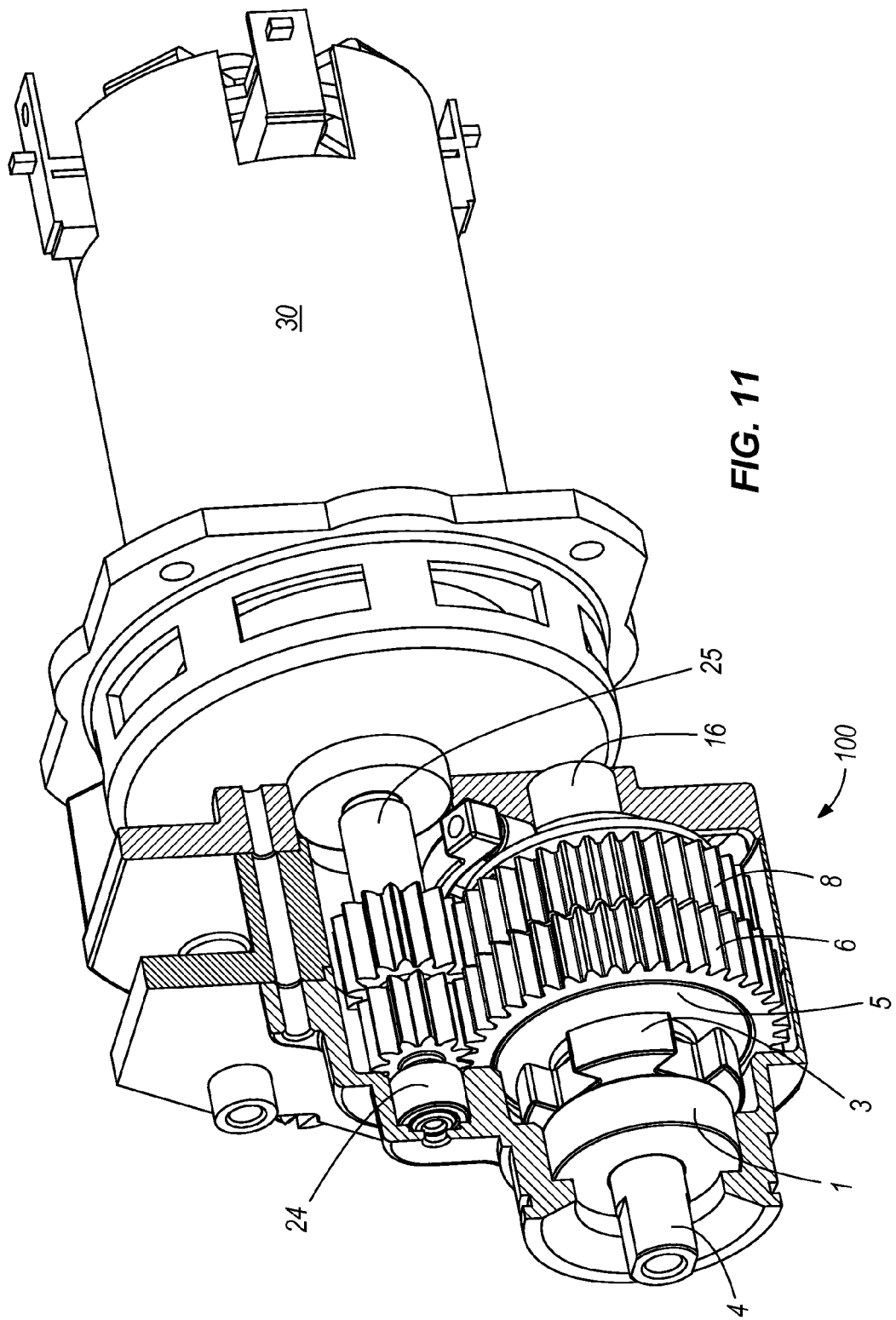
FIG. 11 is a further view of the power tool and transmission assembly of FIG. 9 with portions removed to better illustrate features of the invention.
Figure 12:
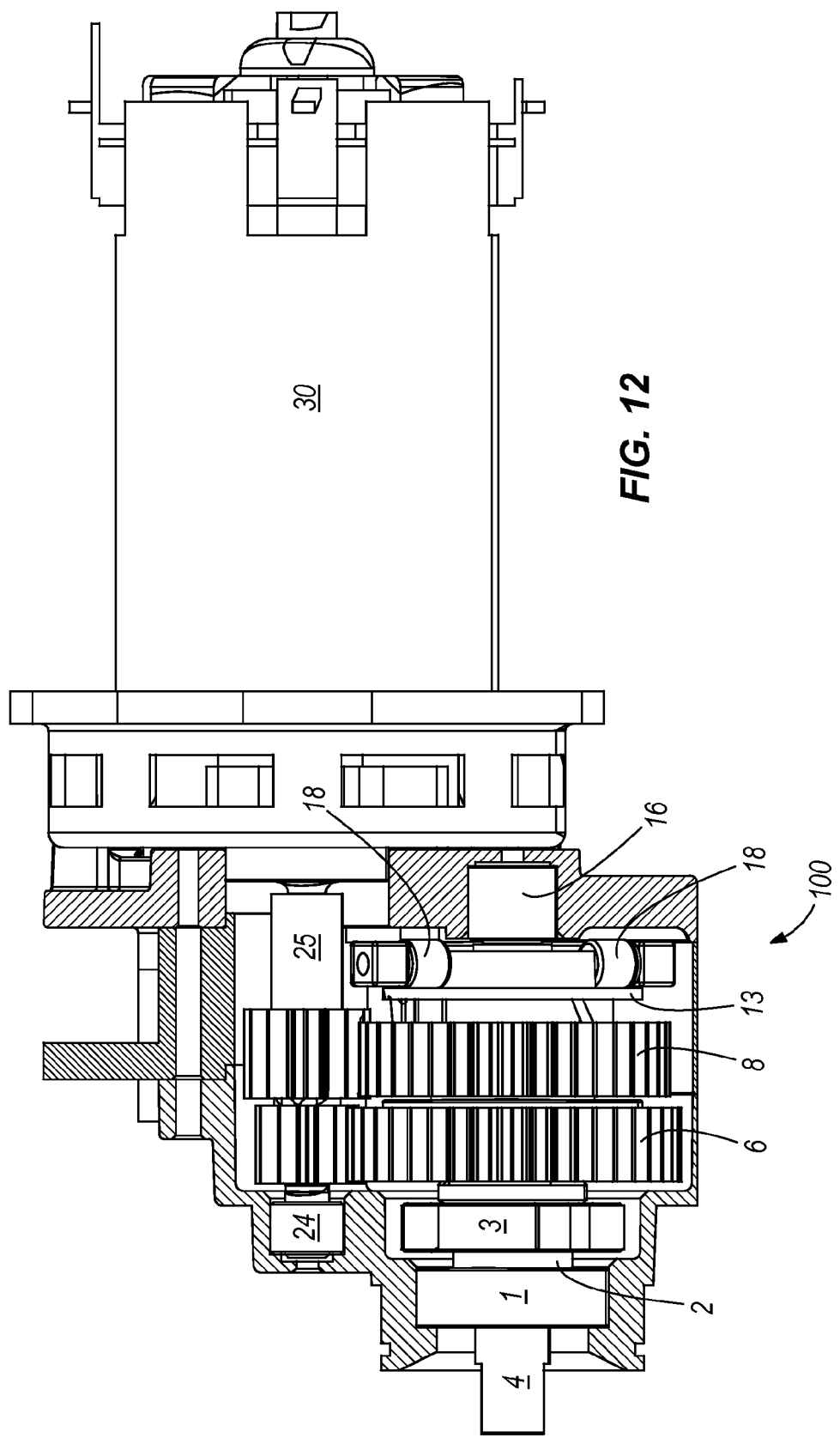
FIG. 12 is a side view of the power tool and transmission assembly of FIG. 9 with portions removed to better illustrate features of the invention.
Figure 13:
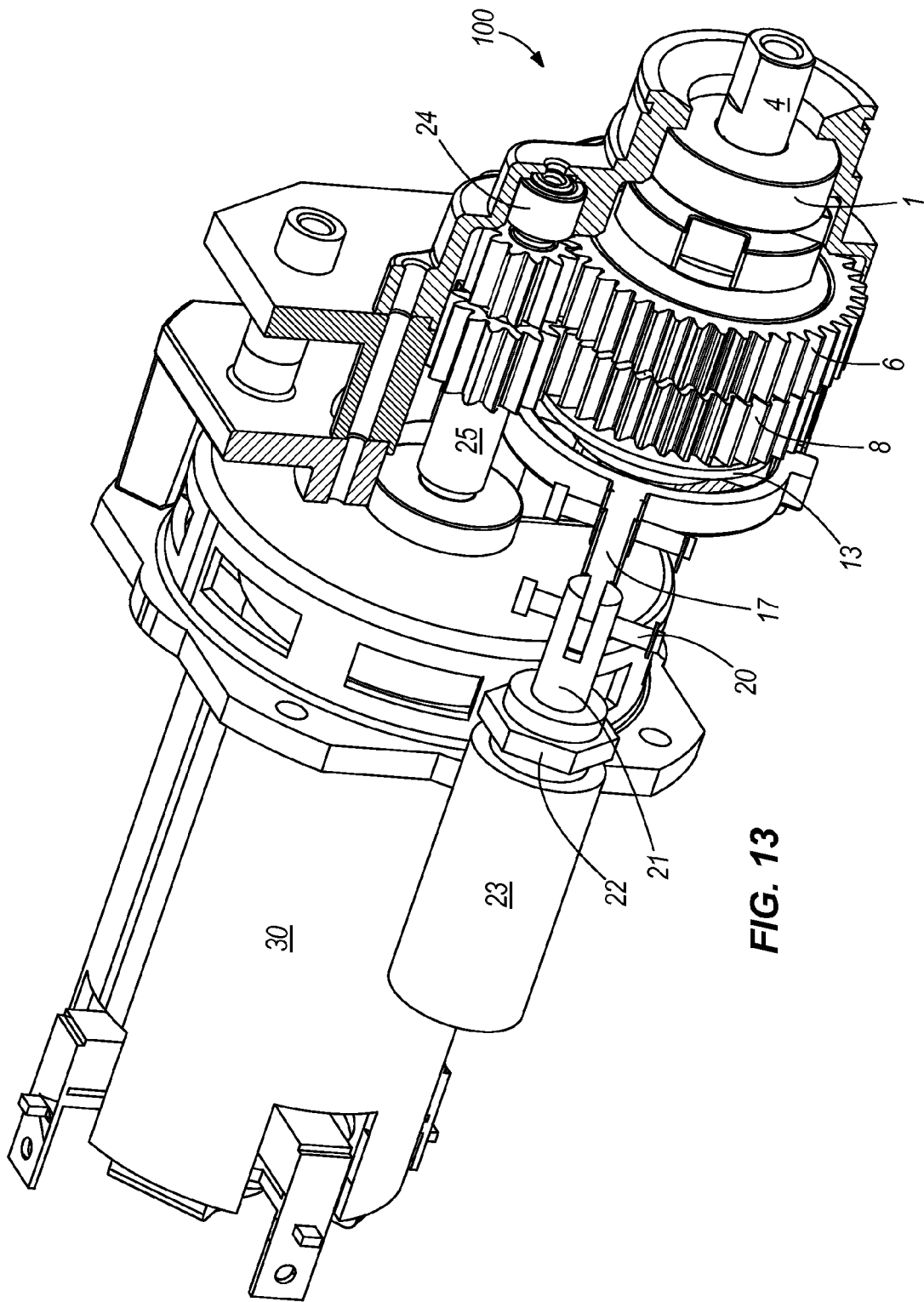
FIG. 13 is another view of the power tool and transmission assembly of FIG. 9 with portions removed to better illustrate features of the invention.
Figure 14:
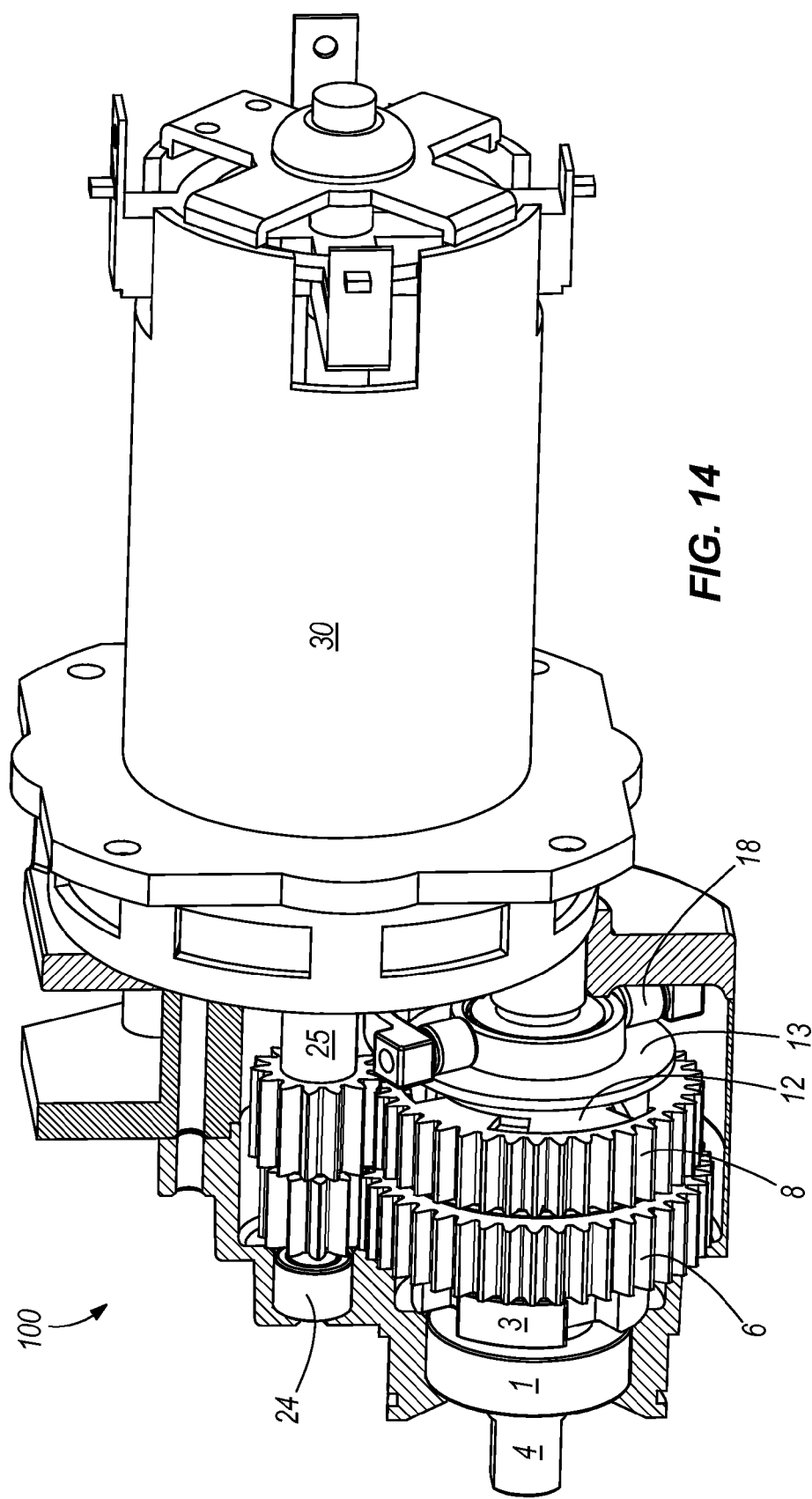
FIG. 14 is another view of the power tool and transmission assembly of FIG. 9 with portions removed to better illustrate features of the invention.
Figure 15:
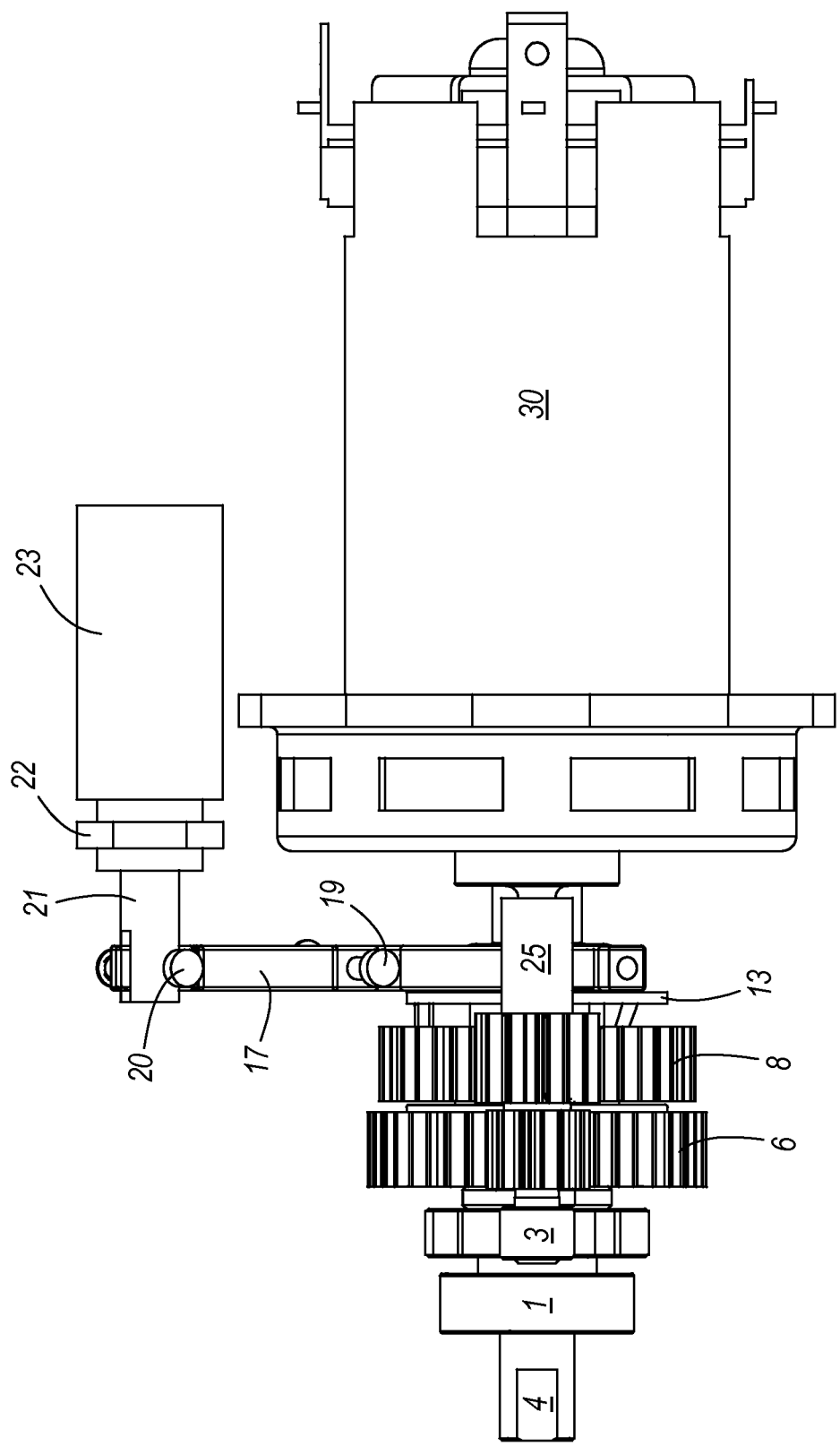
FIG. 15 is another side view of the power tool and transmission assembly of FIG. 9 with portions removed to better illustrate features of the invention.
Figure 16:
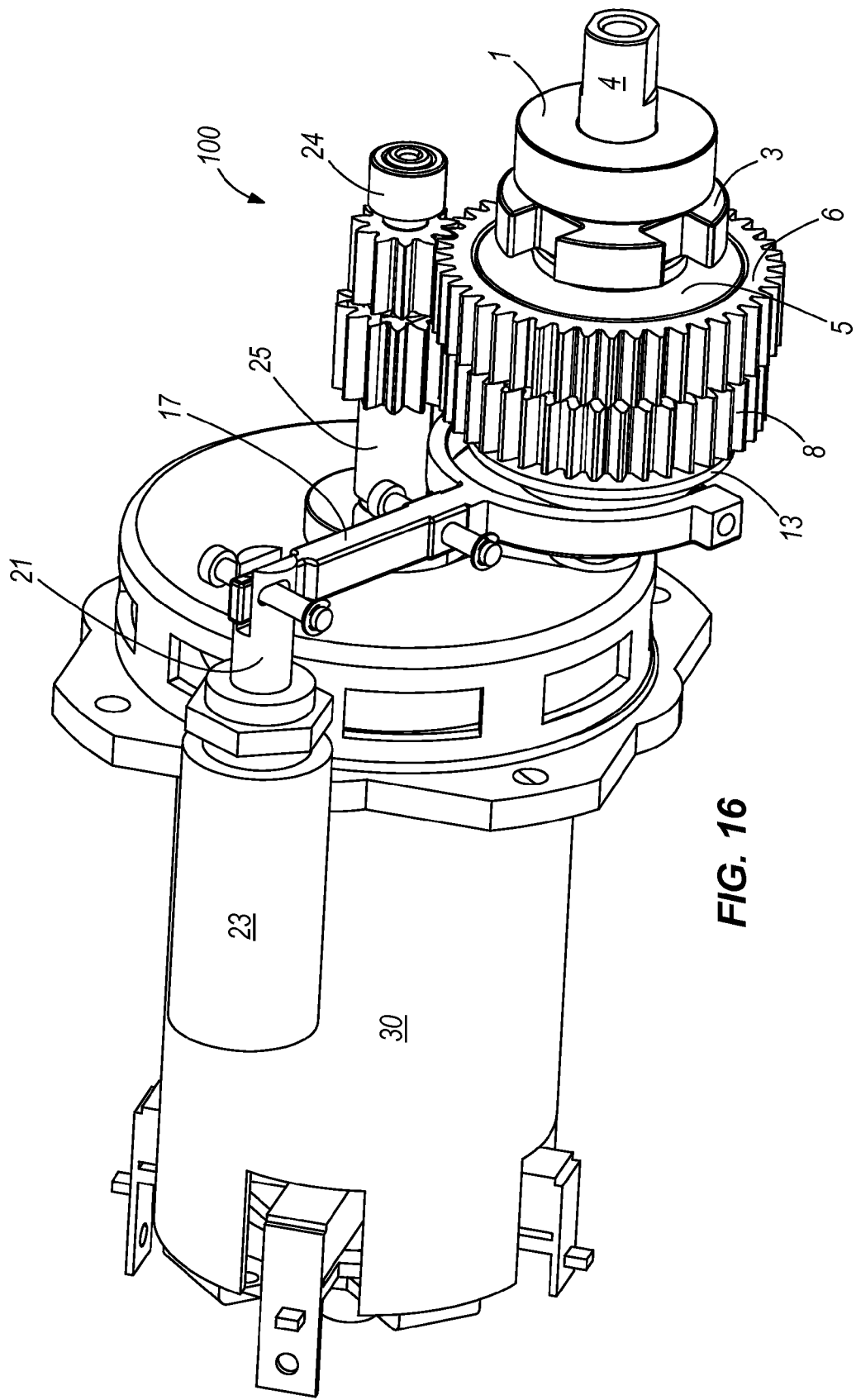
FIG. 16 is another view of the power tool and transmission assembly of FIG. 9 with portions removed to better illustrate features of the invention.
Figure 17:
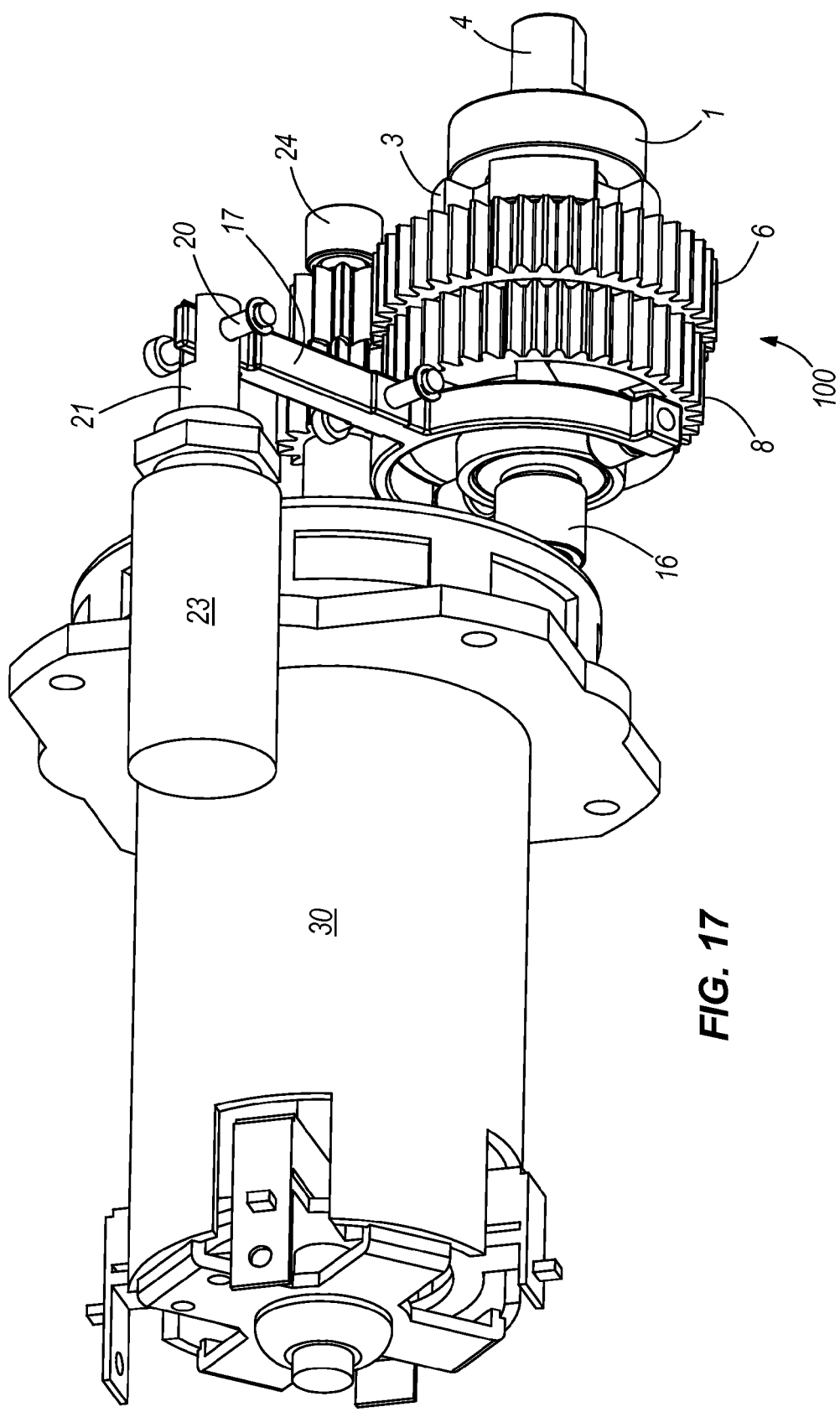
FIG. 17 is another view of the power tool and transmission assembly of FIG. 9 with portions removed to better illustrate features of the invention.

In FIGS. 9 and 10, the assembled motor and transmission assembly are shown in complete form. In contrast, in FIGS. 11 to 17, the assembled motor and transmission assembly are shown with portions of the transmission assembly removed to better illustrate the structure of the transmission assembly comprising the components of FIG. 8.

FIGS. 18 to 32 illustrate the transmission assembly 100 and/or components of said transmission assembly 100. Like numerals to those used to denote the components of the transmission assembly 100 with respect to FIG. 8 will be employed in FIGS. 18 to 32.

Figure 18:
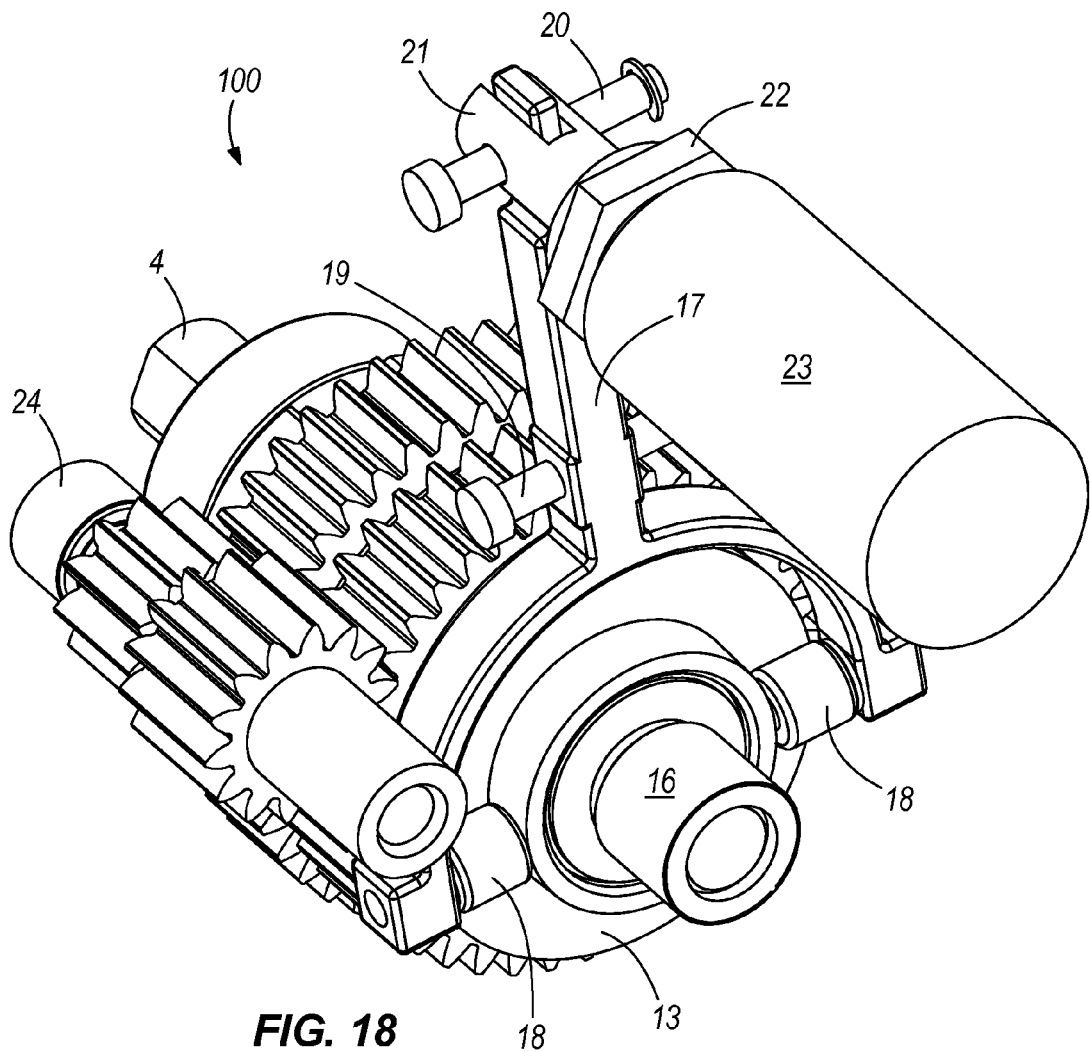
FIG. 18 is a view illustrating a power tool transmission assembly according to the invention.
Figure 19:
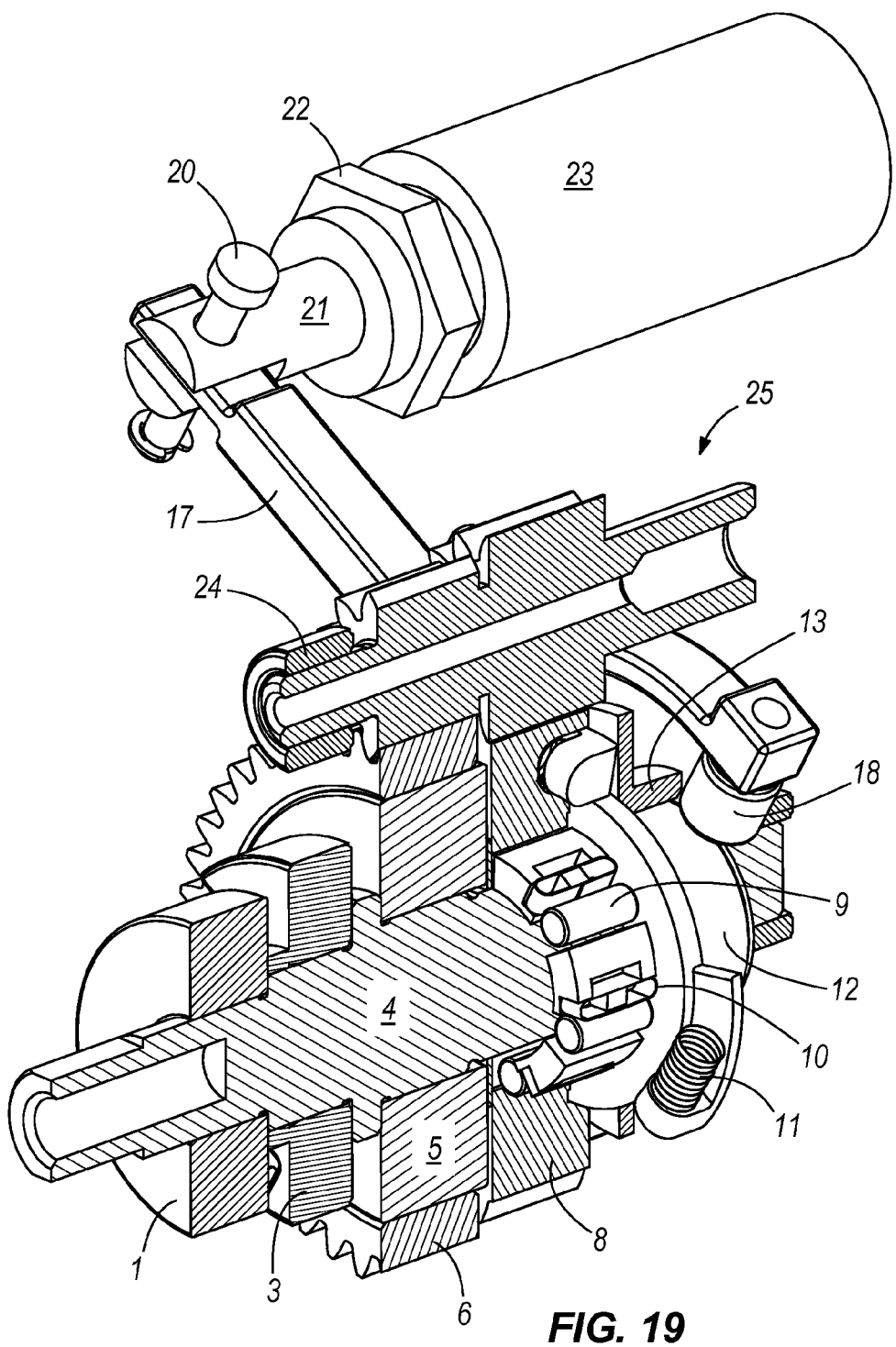
FIG. 19 is a part cut-away view of the transmission assembly of FIG. 18.
Figure 20:
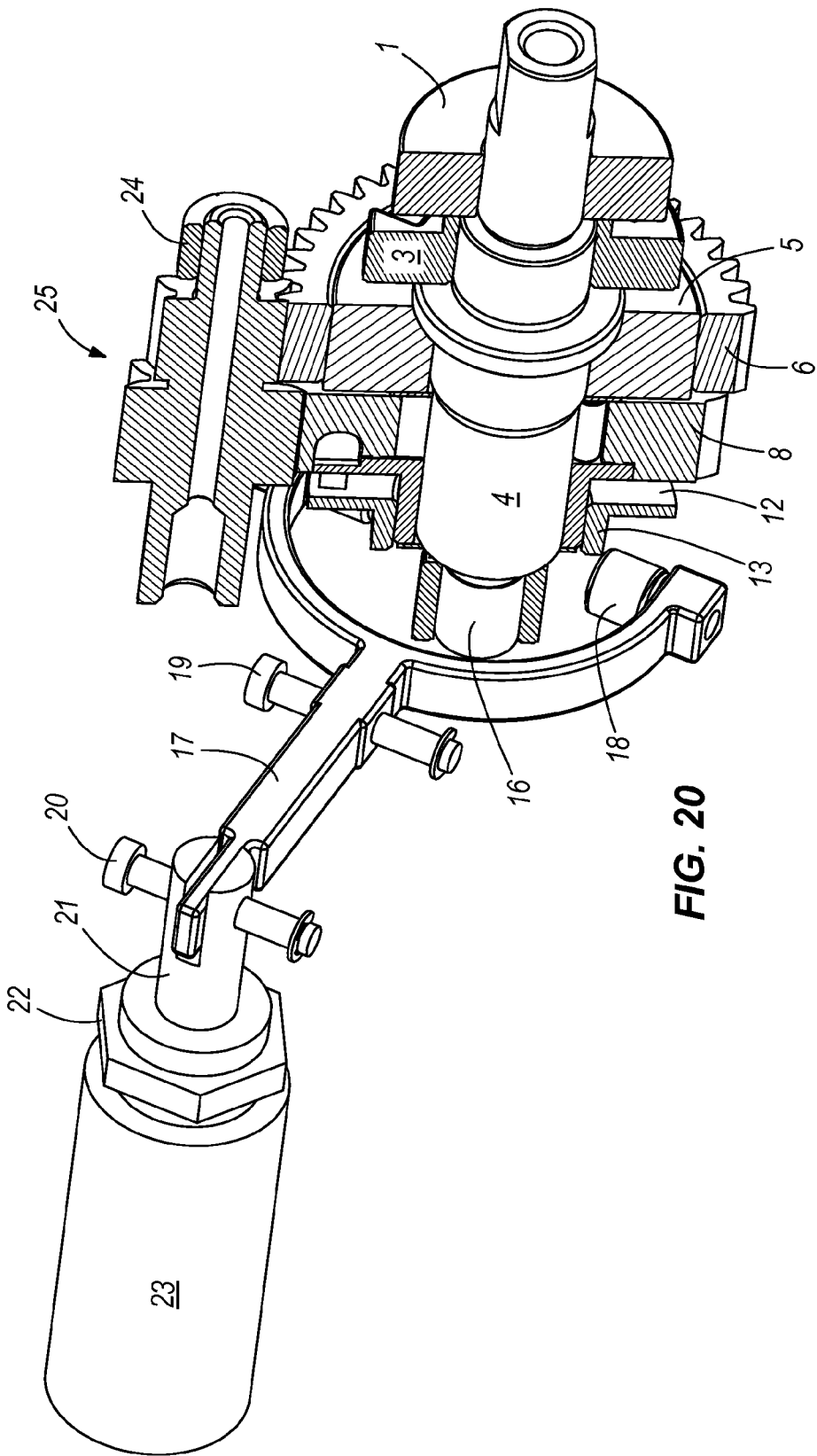
FIG. 20 is another part cut-away view of the transmission assembly of FIG. 18.

FIGS. 18 to 20 show various views of the transmission assembly 100 with FIGS. 19 and 20 showing partially cutaway views of said transmission assembly 100 illustrating the internal construction thereof.

FIGS. 21 to 26 show various views of the transmission assembly and/or components of said assembly in a state representing the high speed mode of operation. As illustrated in FIG. 21, in the high speed mode of operation, the solenoid 23 is de-energized with the plunger 21 in its extended position relative to the solenoid housing. In this position, the plunger holds the lever 17 such that the cam plate 13 occupies its first position axially spaced from the carrier 12 (not shown) whereby the lock pins 9 (not shown) of the carrier 12 fix the first driven gear 8 for rotation with the spindle 4. Consequently, drive toque delivered by the first driving gear 25a to the first driven gear 8 is conveyed to the spindle and the transmission assembly operates at its high speed, low torque mode of operation.

Figure 22:
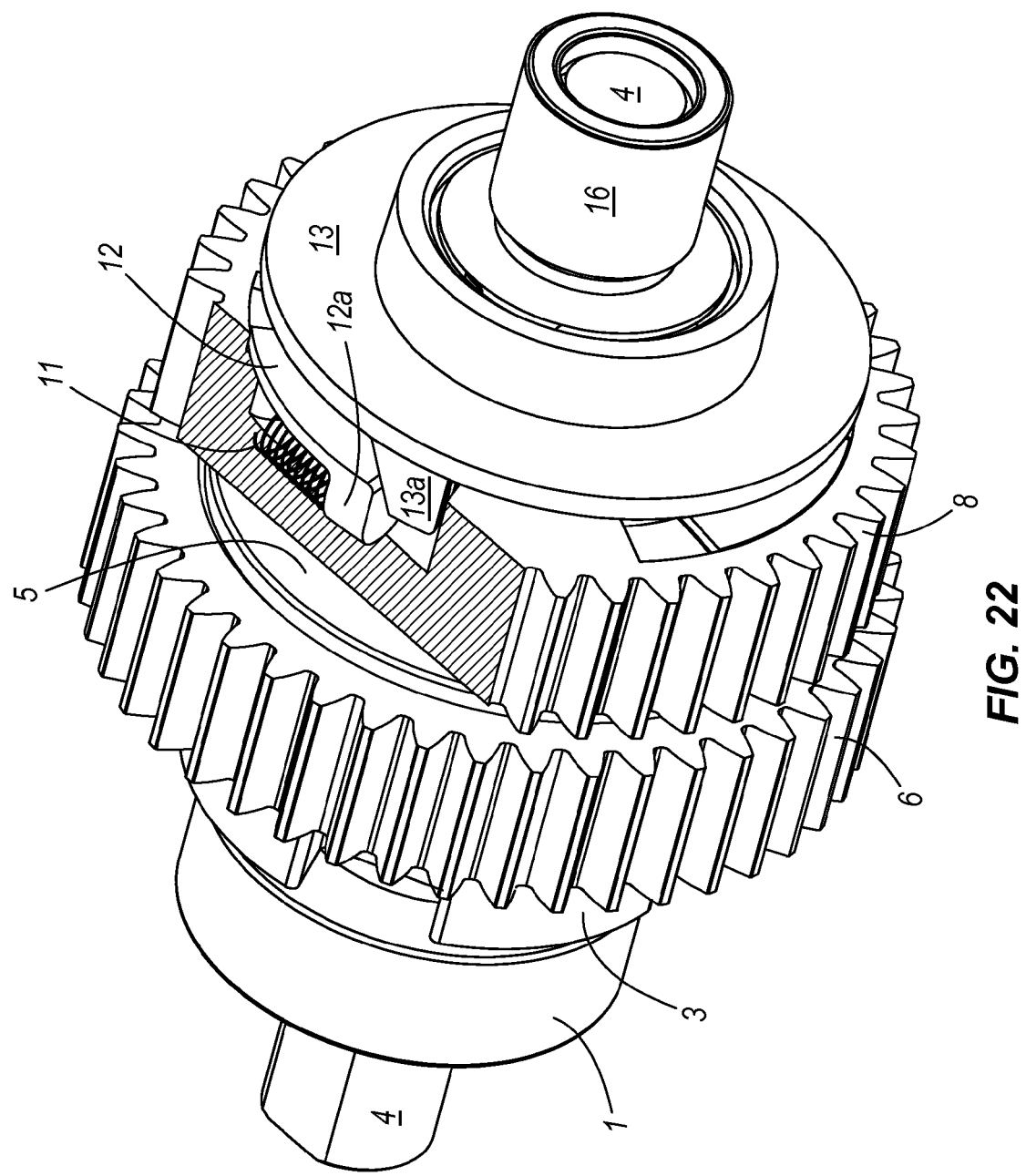
FIG. 22 is a part cut-away view of the driven gears of the transmission assembly of FIG. 18 with the connector in its first position.
Figure 23:
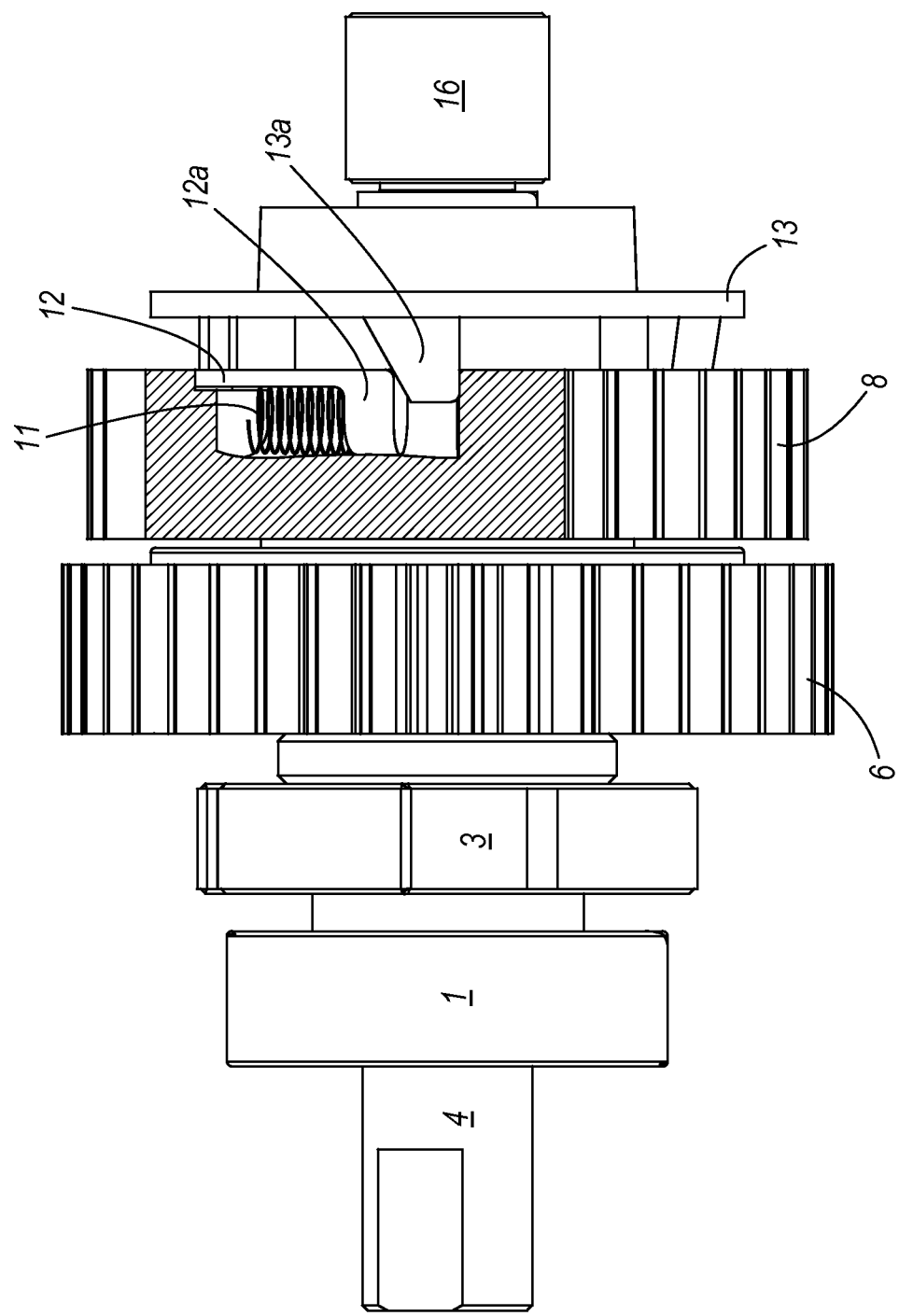
FIG. 23 is another part cut-away view of the driven gears of the transmission assembly of FIG. 18 with the connector in its first position.

FIGS. 22 and 23 are views of the spindle 4 and driven gears 6, 8 part of the transmission assembly 100 with the first driven gear 8 partially cutaway to reveal the spatial relationship of the cam plate 13, carrier 12, springs 11 and first driven gear 8 in said high speed mode of operation. It can be seen that the cam plate 13 is positioned relative to the carrier 12 such that the wedge shaped cam members 13a of the cam plate are in contact at their forward ends with respective back abutment surfaces of respective abutment members 12a of the carrier. The springs 11 which, in use, bias the carrier 12 to its initial first position are located in recesses formed in the first driven gear 8 and arranged such that said springs act against front abutment surfaces of said abutment members 13a to urge the carrier 12 to its usual first position where the lock pins 9 (not shown) of the carrier engage an internal surface of the first driven gear 8 to fix it for rotation with the spindle 4. Axial movement of the cam plate 13 towards the carrier 12 causes the wedge shaped cam members 13a to more fully engage with the back abutment surfaces of the carrier abutment members 12a to cause said carrier to rotate towards its second position in a clockwise direction as seen in FIGS. 22 and 23 against the biasing of the springs 11.

Figure 24:
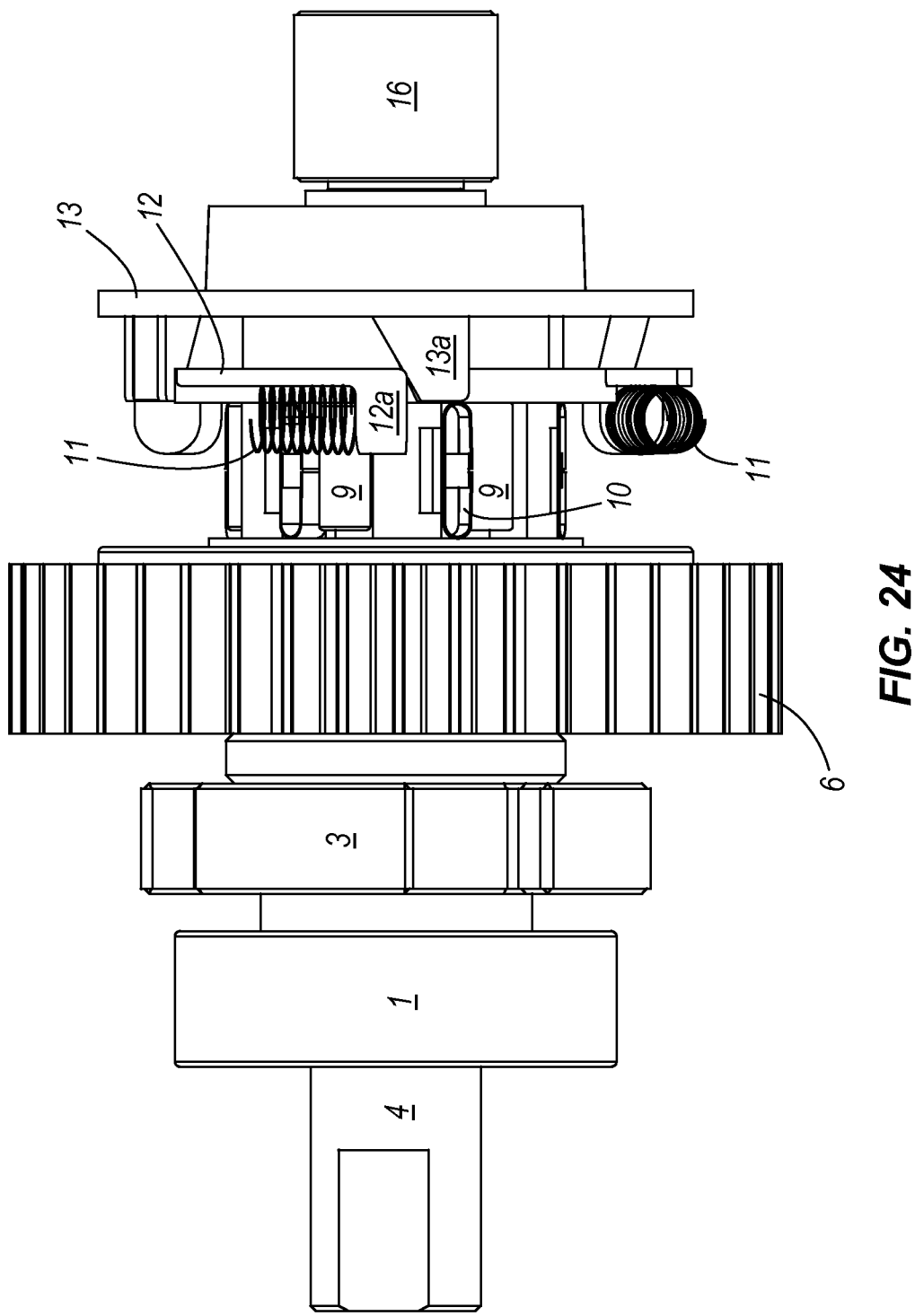
FIG. 24 is yet another part cut-away view of the driven gears of the transmission assembly of FIG. 18 with the connector in its first position.

FIG. 24 is another view of the spindle 4 and driven gears 6, 8 part of the transmission assembly 100 with the first driven gear 8 removed to better illustrate the internal construction of the transmission assembly 100. The lock pins 9 are carried by the carrier 12 and, in the carrier's first position, wedgedly engage an inner surface of the first driven gear 8 and an outer surface of the spindle 4 to thereby fix the position of the first driven gear 8 with respect to the spindle 4 such that drive applied to the first driven gear 8 is conveyed to the spindle 4.

Figure 25:
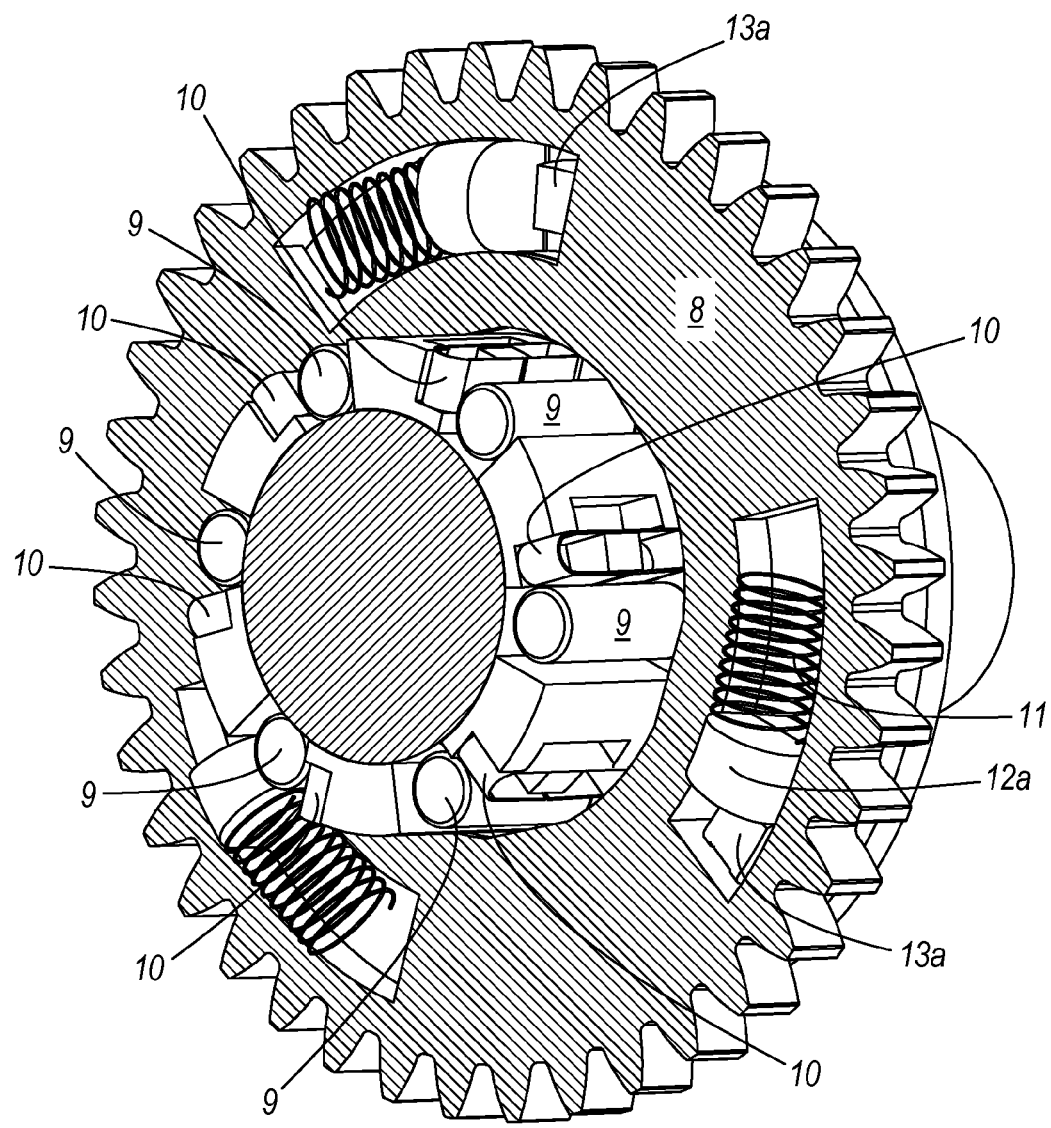
FIG. 25 is a perspective view illustrating the first driven gear of the transmission assembly of FIG. 18 with the connector in its first position.
Figure 26:
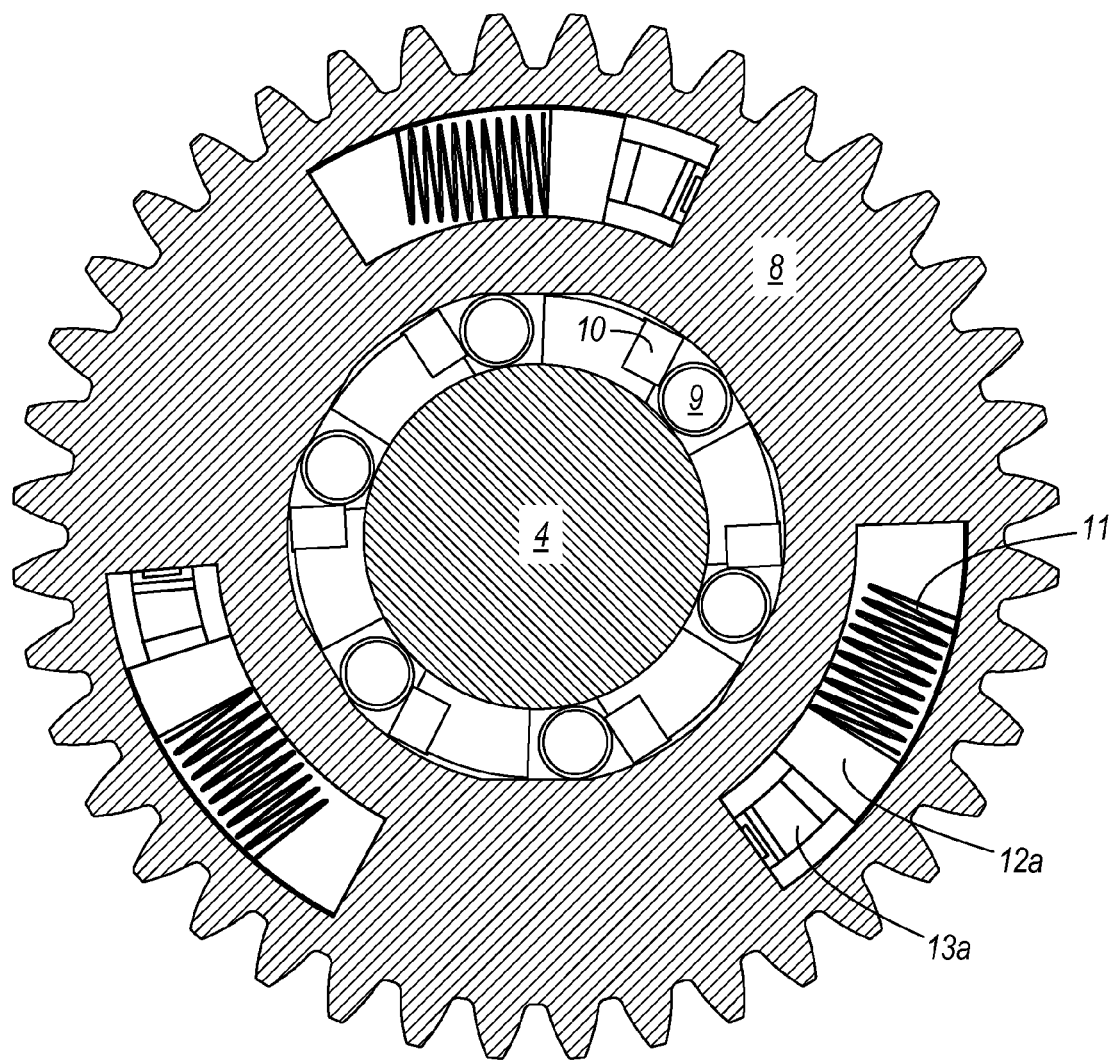
FIG. 26 is an end view illustrating the first driven gear of the transmission assembly of FIG. 18 with the connector in its first position.

FIG. 25 is a perspective view of a part section of the first driven gear 8 and the carrier 12 and cam plate 13, also showing the cam plate 13 and carrier 12 in their respective first positions with respect to other components of the transmission assembly 100. FIG. 26 is an end view corresponding to FIG. 25. In this view, it can be seen that the lock pins 9 are wedgedly engaged between an inner surface of the first driven gear 8 and an outer surface of the spindle 4 and held in position by the spring plates 10 which are also carried by the carrier 12.

Figure 27:
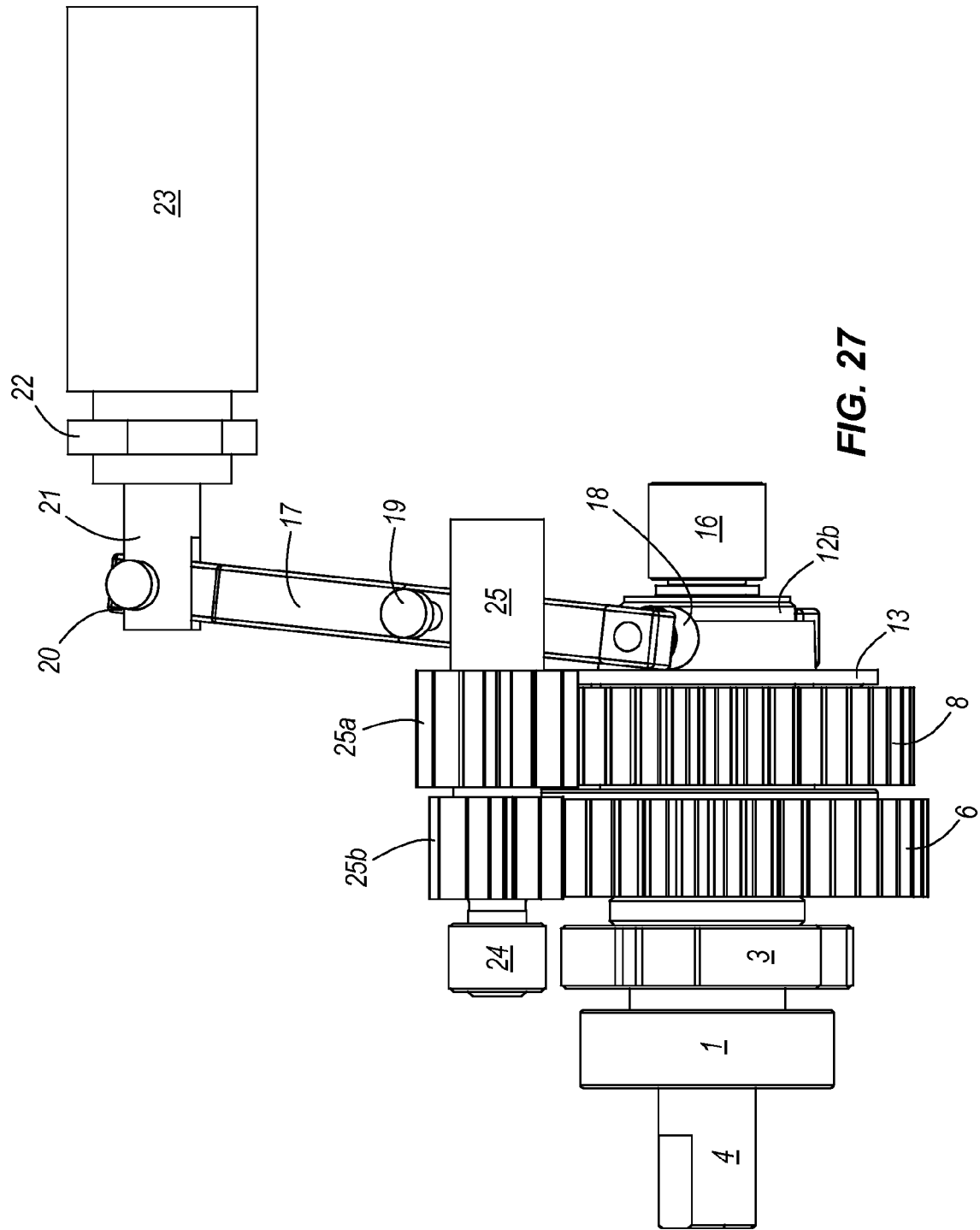
FIG. 27 is a side view of the transmission assembly of FIG. 18 with the connector in its second position.

FIGS. 27 to 32 show various views of the transmission assembly 100 and/or components of said assembly in a state representing the low speed mode of operation. As illustrated in FIG. 27, in the low speed mode of operation, the solenoid 23 is energized with the plunger 21 in its withdrawn or pulled in position relative to the solenoid housing. In this position, the plunger operates the lever 17 to pivot about pin 19 such that the lever causes the cam plate 13 to move axially towards the carrier 12 to occupy its first position axially adjacent to the carrier 12 (not shown) whereby the lock pins 9 (not shown) of the carrier 12 are freed from fixing the first driven gear 8 for rotation with the spindle 4. Consequently, drive toque delivered by the first driving gear 25a to the first driven gear 8 is not conveyed to the spindle and the first driven gear 8 rotates independently from the spindle 4. In this configuration, drive provided to the second driven gear 6 by the second driving gear 25b is conveyed to the spindle 4 at the transmission's low speed, high torque mode of operation as hereinbefore described.

Figure 28:
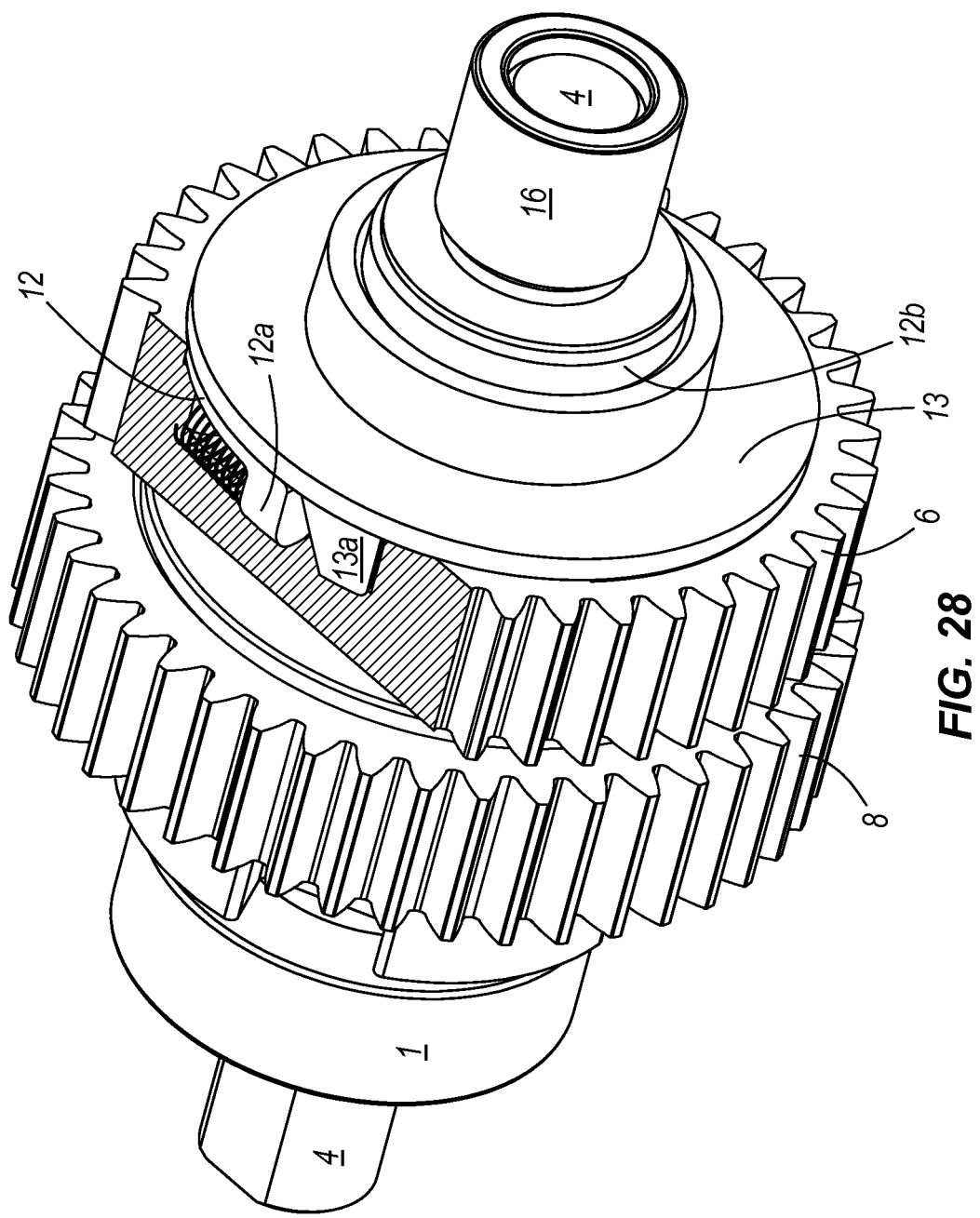
FIG. 28 is a part cut-away view of the driven gears of the transmission assembly of FIG. 18 with the connector in its second position.
Figure 29:
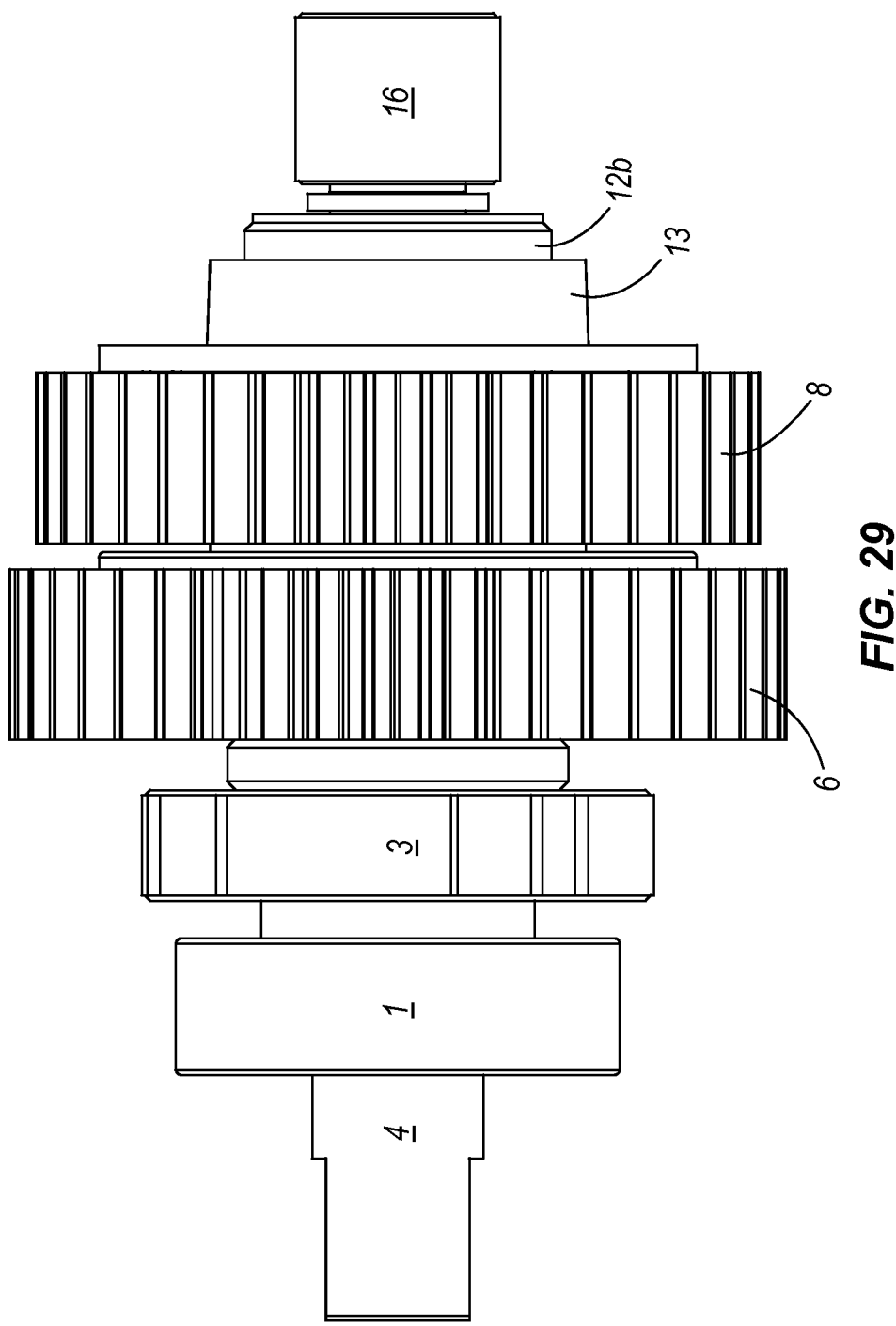
FIG. 29 is another part cut-away view of the driven gears of the transmission assembly of FIG. 18 with the connector in its second position.

FIGS. 28 and 29 are views of the spindle 4 and driven gears 6, 8 part of the transmission assembly 100 with the first driven gear 8 partially cutaway to reveal the spatial relationship of the cam plate 13, carrier 12, springs 11 and first driven gear 8 in said low speed mode of operation. It can be seen that the cam plate 13 has been caused to move axially over the collar 12b of the carrier and in towards the carrier 12 such that said cam plate is adjacent the flange of the carrier 12. In this position, the wedge shaped cam members 13a of the cam plate contact with respective back abutment surfaces of respective abutment members 12a of the carrier at rearward points of front sloping edges of said cam members 13a. In this position of the cam plate, 13, the axial movement of the cam plate 13 towards the carrier 12 has caused the cam members 13a to fully engage with the back abutment surfaces of the carrier abutment members 12a to cause said carrier 12 to rotate towards its second position in a clockwise direction as seen in FIGS. 28 and 29 against the biasing of the springs 11.

Figure 30:
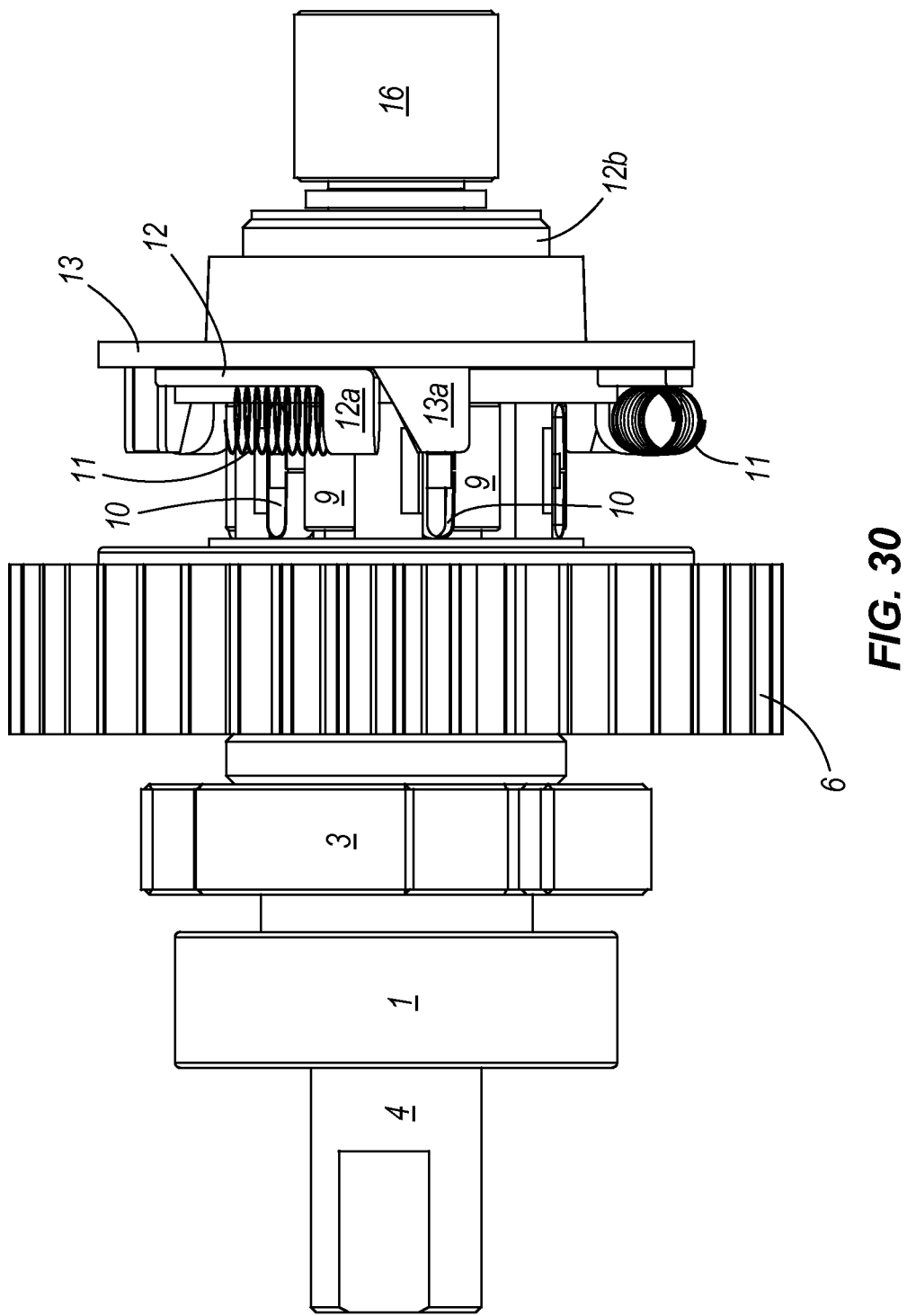
FIG. 30 is yet another part cut-away view of the driven gears of the transmission assembly of FIG. 18 with the connector in its second position.

FIG. 30 is another view of the spindle 4 and driven gears 6, 8 part of the transmission assembly 100 with the first driven gear 8 removed to better illustrate the internal construction of the transmission assembly 100 when the cam plate 13 and carrier 12 are in their second positions. In these positions, the lock pins 9 carried by the carrier 12 no longer wedgedly engage the inner surface of the first driven gear 8 and the outer surface of the spindle 4 and therefore the first driven gear 8 is free to rotate independently of the spindle 4.

Figure 31:
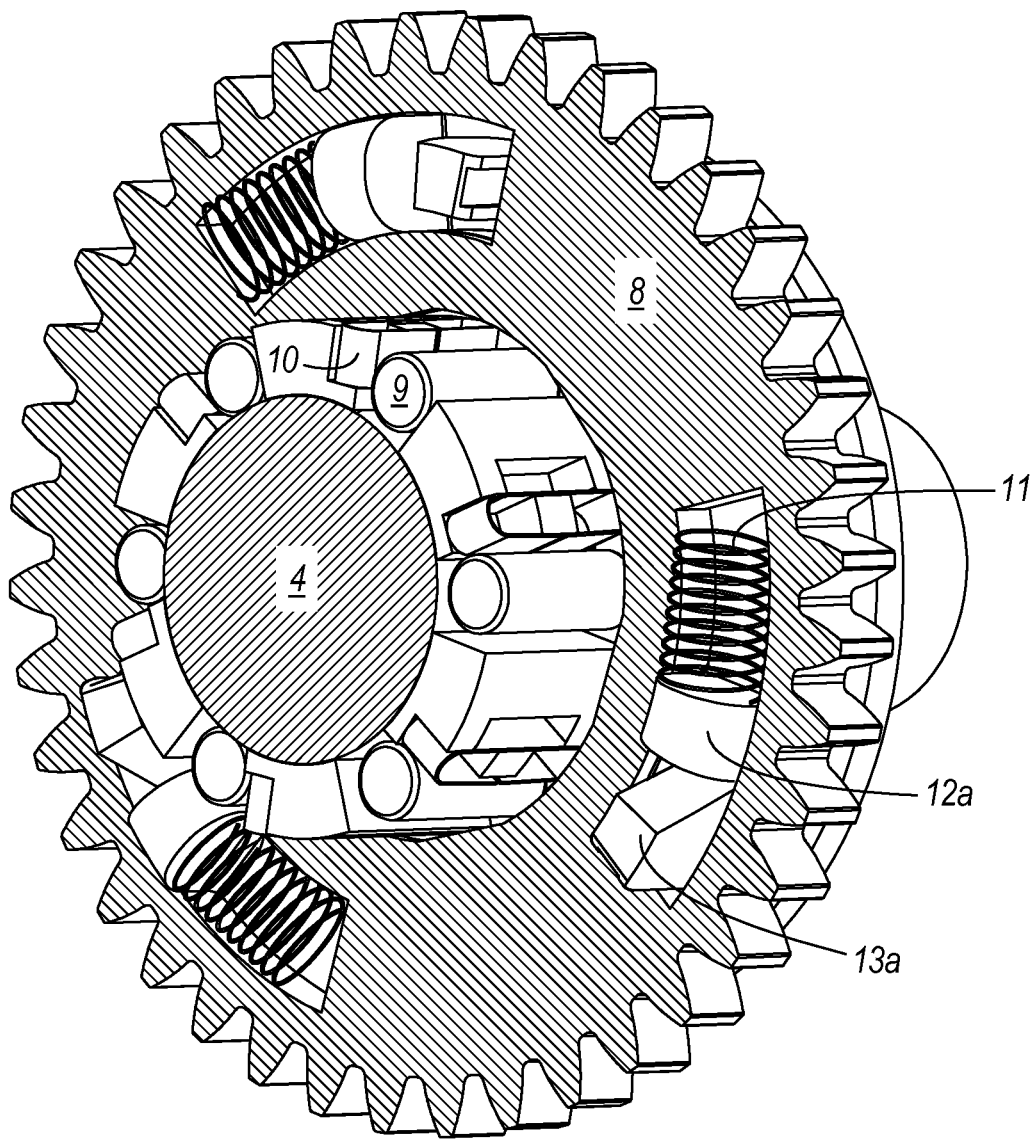
FIG. 31 is a perspective view illustrating the first driven gear of the transmission assembly of FIG. 18 with the connector in its second position.
Figure 32:
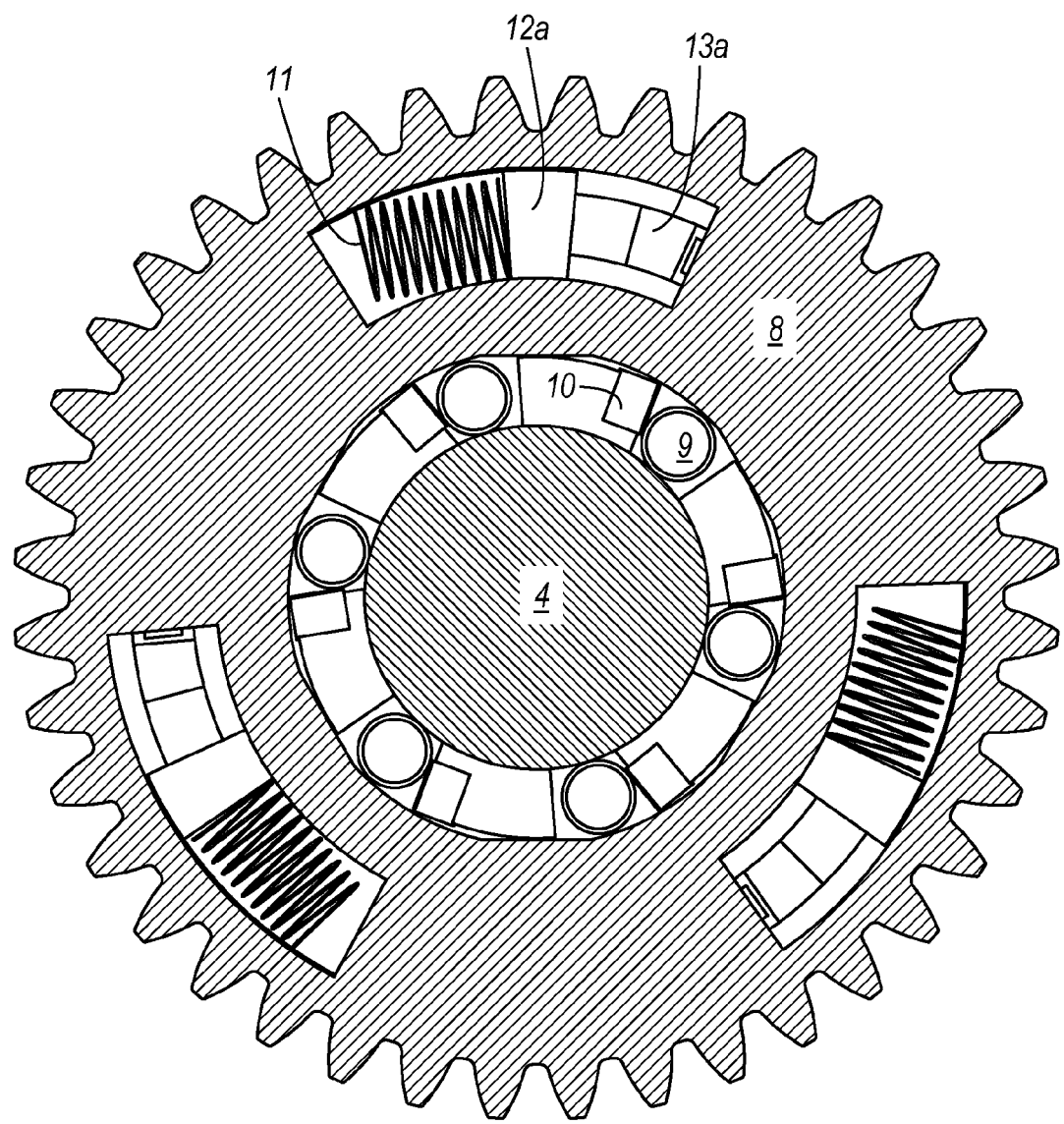
FIG. 32 is an end view illustrating the first driven gear of the transmission assembly of FIG. 18 with the connector in its first position.

FIG. 31 is a perspective view of a part section of the first driven gear 8 and the carrier 12 and cam plate 13, also showing the cam plate 13 and carrier 12 in their respective second positions with respect to other components of the transmission assembly 100. FIG. 32 is an end view corresponding to FIG. 31. In this view, it can be seen that the lock pins 9 are now located at a position relative to the first driven gear 8 where a gap or recess defined between the inner surface of the first driven gear and the outer surface of the spindle 4 is larger than a diameter of said lock pins such that the first driven gear 8 is no longer fixed to rotate with the spindle 4.

It will be appreciated that operation of the cam plate 13 to cause rotation of the carrier 12 about the spindle 4 to move said carrier 12 from its first position to its second position enables a change of speed from the high speed, low torque mode to the low speed, high torque mode to be effected whilst the transmission is operating. One reason is because the arrangement of the invention does not require the rearrangement of meshing gears to effect a change in the speed of operation. Furthermore, when the cam plate is operated to move axially away from the carrier 12 back to its initial position allowing the springs 11 to urge the carrier to return to its initial position, this results in a change from the low speed mode of operation to the high speed mode of operation by virtue of the fact that the lock pins 9 of the carrier 12 reengage with the inner surface of the first driven gear 8 and the outer surface of the spindle 4 to fix the first driven gear 8 for rotation with the spindle 4. This change in mode of operation can also be performed whilst the transmission is operating.

Consequently, successive changes in speed of operation between the high speed and low speed modes can be effected during continuous operation of the power tool without the need to stop the power tool. In the preferred embodiments, the successive changes of speed are effected automatically in response to monitored load exerted on the power tool motor.

Whilst the preferred embodiments describe a power tool transmission with two speeds of operation as defined by first and second transmission paths, it will be understood that a power tool transmission falling within the scope of the appended claims could have more than two speeds of operation. For example, the transmission assembly as described above can be adapted to have a high speed, low torque mode of operation, an intermediate speed, intermediate torque mode of operation, and a low speed, high torque mode of operation. This is achieved by modifying the transmission assembly as described with respect to FIGS. 1 to 32 to have a third transmission path defining the intermediate mode of operation and taking advantage of the fact that the cam plate, carrier and lock pin arrangement as described with respect to FIGS. 1 to 32 operates in a similar manner to an overrunning bearing or clutch when the output shaft of the transmission is caused to rotate at a higher speed than the driven gear of a transmission path, such as an intermediate transmission path, having a connector of the type aforesaid to engage the driven gear of that transmission path and fix it for rotation with the output shaft. This is because, the wedging action of the lock pins carried by the carrier act to fix or lock the driven gear of a transmission path for rotation with the output shaft in one defined direction only, but not in the opposite direction to the defined direction. Such an intermediate transmission path is similar in configuration to that of the afore-described high speed transmission path having a driving gear mounted on the input shaft of the transmission assembly arranged to mesh with and drive a further driven gear mounted on the output shaft. The ratio of the drive gear to the driven gear defines the intermediate speed of operation of this further transmission path. The driven gear of the intermediate transmission path also has a connector of the aforesaid type for engaging and disengaging the driven gear from the output shaft. The connector operates to engage the driven gear with the output shaft to fix it for rotation in a defined direction through the wedging action of the lock pins between an inner surface of the driven gear and an outer surface of the output shaft. In other words, when the driven gear of the intermediate transmission path is being driven at a speed that is tending to exceed that of the output shaft (although it cannot actually exceed said speed), the driven gear pushes the lock pins of the carrier to wedgedly engage the driven gear to the output shaft and thus drive provided to the driven gear is conveyed to the output shaft and the output shaft is driven at the operating speed of the intermediate transmission path. However, in the event that the output shaft is driven at a speed of rotation faster than the speed of rotation of the driven gear of the intermediate transmission path, the faster speed of the output shaft relative to the driven gear releases to a sufficient degree the wedged engagement of the lock pins between the driven gear and the output shaft such that the driven gear can slide relative to the output shaft, i.e. rotate at a slower speed than the output shaft. Thus, even though the cam plate, carrier and lock pins of the intermediate transmission path are in their engaged positions, they act in the manner of an overrunning bearing to allow the driven gear of the intermediate transmission path to rotate more slowly than the output shaft. This has the advantage that for high speed operation of the transmission, the respective solenoids of the high and intermediate speed transmission paths can be de-energized.

In operation, when both of the connectors of the high and intermediate speed transmission paths are operated to disengage their respective driven gears from the output shaft, the transmission operates at its low speed mode of operation as defined by the low speed transmission path having a driven gear mounted on the output shaft by an overrunning bearing or clutch. In this mode of operation, the driven gears of the high and intermediate speed transmission paths continue to be driven but neither conveys any drive to the output shaft as each of said driven gears rotates independently of the output shaft. Disengaging the respective driven gears of the high and intermediate speed transmission paths may be achieved by energizing respective solenoids arranged to actuate respective levers or mode switches of said transmission paths. The solenoids, when energized, are arranged to actuate the levers or mode switches to move respective cam plates axially towards respective carriers thereby causing the respective connectors of said high and intermediate speed transmission paths to become disengaged from, i.e. to be no longer fixed for rotation with, the output shaft in the defined direction. The cam plate, carrier and connector arrangements for the high and intermediate speed transmission paths in this embodiment may have the same structure and configuration as the cam plate, carrier and connector arrangement described with respect to FIGS. 1 to 32.

The intermediate speed mode of operation is selected by arranging for the connector of the intermediate transmission path to engage its driven gear with the output shaft and to arrange for the driven gear of the high speed transmission path to not be engaged with the output shaft. This may be achieved by energizing the solenoid of the high speed transmission path and de-energizing the solenoid of the intermediate speed transmission path. In this mode, the overrunning bearing of the low speed transmission path allows the output shaft to rotate more quickly than the driven gear of the low speed transmission path which is permanently driven. The driven gear of the high speed transmission path rotates independently of the output shaft, whereas the driven gear of the intermediate speed transmission path, which is fixed for rotation by its respective connector with the output shaft in the defined direction, delivers drive to said output shaft at an intermediate speed and intermediate torque.

The high speed mode of operation is selected by arranging for the connector of the high transmission path to engage its driven gear with the output shaft and to arrange for the driven gear of the intermediate speed transmission path to be engaged or remain engaged with the output shaft. This may be achieved by de-energizing the respective solenoids of the high and intermediate speed transmission. The driven gear of the intermediate speed transmission path continues to be driven, but is allowed to rotate at a slower speed than the output shaft through the clutch action of its connector, despite said connector being in its operative position that would normally fix the driven gear of the intermediate transmission path for rotation with the output shaft. However, the driven gear of the high speed transmission path, which is now fixed for rotation by its respective connector with the output shaft in the defined direction, delivers drive to said output shaft at a high speed and low torque.

The high, intermediate and low speed mode of operation could be automatically switched between in response to monitored load of the power tool motor, i.e. an operating current of the motor. Such automatic speed mode switching could be performed in connection with a respective current threshold for each mode of operation. Furthermore, it will be appreciated that changes of mode of operation between the high, intermediate and low speeds can be performed as before when the transmission is operating.

It will be appreciated that the references to energizing and de-energizing the respective solenoids may be reversed where the state of energizing a solenoid causes the connector of its transmission path to engage the transmission path's driven gear with the output shaft.

It will be appreciated that further intermediate speeds of operation could be defined by adding further transmission paths having a similar configuration as the high speed transmission path, but with different gear ratios defining respective intermediate speeds of operation. In such an embodiment, where a speed selection is made from one of the transmission paths, it would be necessary to arrange for respective solenoids of any of the transmission paths of higher speed of operation than the selected transmission path to be energized. This ensures that respective connectors for all of said higher speed of operation transmission paths above the selected transmission path to disengage their respective driven gears from the output shaft. A controller may be provided to effect this. Again, references to energizing and de-energizing the respective solenoids may be reversed where the state of energizing a solenoid causes the connector of its transmission path to engage the transmission path's driven gear with the output shaft.

In general, the invention provides a transmission assembly for a power tool comprising a first transmission path constituting a high speed transmission path and a second transmission path constituting a low speed transmission path. Driven gears of each transmission path are permanently driven during operation of the transmission. A controller is provided for engaging or disengaging the high speed transmission path in response to monitored operating current of an electric motor providing a driving torque to an input of the transmission. When disengaged, a driven gear of the high speed transmission path continues to be driven, but the driven gear is disengaged from an output of the transmission. Consequently, under these circumstances, the low speed transmission path is the 'active' transmission path providing a low speed, high torque drive to the transmission output. A clutch enables the low speed transmission path to operate at a lower speed than an output of the transmission assembly when the high speed transmission path is engaged and is providing a high speed, low torque drive to the transmission output.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

What is claimed is:

1. A transmission assembly for a power tool comprising:
   an input shaft;
   a first driving gear coupled to the input shaft for co-rotation therewith;
   an output shaft having a first driven gear continuously engaged with the first driving gear;
   a first transmission path comprising a high speed transmission path;
   a second transmission path comprising a low speed transmission path;
   a controller for one of engaging and disengaging the high speed transmission path; and
   a clutch for enabling the low speed transmission path to operate at a lower speed than an output of the transmission assembly when the high speed transmission path is engaged,
   wherein torque from the input shaft is transferred through the first driven gear when the high speed transmission path is engaged, and
   wherein the first driving gear is coupled to the input shaft for co-rotation therewith in both the high speed and low speed transmission paths.

2. The transmission assembly of claim 1, wherein the clutch includes an overrunning bearing.

3. The transmission assembly of claim 1, wherein the output shaft has a second driven gear, and
   wherein the clutch is positioned between the output shaft and the second driven gear to permit overrunning of the second driven gear relative to the output shaft.

4. The transmission assembly of claim 3, wherein the clutch is operable to permit overrunning of the second driven gear relative to the output shaft when the high speed transmission path is engaged.

5. The transmission assembly of claim 3, wherein torque from the input shaft is transferred through the second driven gear when the high speed transmission path is disengaged.

6. The transmission assembly of claim 3, further comprising:
   a second driving gear coupled to the input shaft for co-rotation therewith.

7. The transmission assembly of claim 6, wherein the second driving gear is continuously engaged with the second driven gear.

8. The transmission assembly of claim 3, wherein the controller is automatically operable to perform one of engaging and disengaging the first driven gear from the output shaft to engage and disengage, respectively, the high speed transmission path.

9. The transmission assembly of claim 8, wherein the controller is automatically operable to perform one of engaging and disengaging the first driven gear from the output shaft in response to a load exerted on the output shaft.

10. The transmission assembly of claim 9, wherein the controller is operable to monitor the load exerted on the output shaft by monitoring a current drawn by an electric motor driving the input shaft.

11. The transmission assembly of claim 10, wherein the controller is operable to detect an operating current of the electric motor and to compare the operating current to a threshold current, and wherein the transmission assembly further includes
   a solenoid electrically connected to the controller, and
   a connector movable between a first position in which the first driven gear is engaged to the output shaft, and a second position in which the first driven gear is disengaged from the output shaft, wherein the connector is movable between the first and second positions in response to one of energizing and de-energizing the solenoid.

12. The transmission assembly of claim 11, wherein the controller is operable to compare the operating current of the electric motor to first and second threshold currents, wherein the first threshold current is higher than the second threshold current, and wherein, when the operating current equals or exceeds the first threshold current, the connector is operated to disengage the first driven gear from the output shaft and, when the operating current is equal to or below the second threshold current, the connector is operated to engage the first driven gear to the output shaft.

13. The transmission assembly of claim 12, wherein a difference between the first and second threshold currents is selected as being of sufficient magnitude to prevent the connector being operated to successively disengage and engage the first driven gear to the output shaft within a short period of time.

* * * * *